(12) United States Patent
Hirasawa et al.

(10) Patent No.: US 11,405,603 B2
(45) Date of Patent: *Aug. 2, 2022

(54) IMAGING DEVICE, IMAGE PROCESSING DEVICE AND IMAGE PROCESSING METHOD

(71) Applicant: SONY CORPORATION, Tokyo (JP)

(72) Inventors: Yasutaka Hirasawa, Tokyo (JP); Yuhi Kondo, Tokyo (JP); Ying Lu, Tokyo (JP); Ayaka Nakatani, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 51 days.

This patent is subject to a terminal disclaimer.

(21) Appl. No.: 16/942,323

(22) Filed: Jul. 29, 2020

(65) Prior Publication Data

US 2020/0359005 A1 Nov. 12, 2020

Related U.S. Application Data

(63) Continuation of application No. 15/540,396, filed as application No. PCT/JP2015/084401 on Dec. 8, 2015, now Pat. No. 10,798,367.

(30) Foreign Application Priority Data

Feb. 27, 2015 (JP) .................................. 2015-038165

(51) Int. Cl.
*H04N 13/271* (2018.01)
*G03B 17/12* (2021.01)
(Continued)

(52) U.S. Cl.
CPC .......... *H04N 13/271* (2018.05); *G01B 11/24* (2013.01); *G03B 17/12* (2013.01); *G03B 35/10* (2013.01);
(Continued)

(58) Field of Classification Search
None
See application file for complete search history.

(56) References Cited

U.S. PATENT DOCUMENTS

| | | | |
|---|---|---|---|
| 2010/0208060 A1* | 8/2010 | Kobayashi | B60S 1/0844 348/148 |
| 2010/0209016 A1* | 8/2010 | Kimata | H04N 1/3871 382/284 |

(Continued)

FOREIGN PATENT DOCUMENTS

| | | |
|---|---|---|
| CN | 101821769 A | 9/2010 |
| CN | 102047651 B | 3/2013 |

(Continued)

OTHER PUBLICATIONS

Jun. 14, 2019, Chinese Office Action issued for related CN Application No. 201580076615.5.

(Continued)

*Primary Examiner* — Kaitlin A Retallick
(74) *Attorney, Agent, or Firm* — Paratus Law Group, PLLC

(57) ABSTRACT

A third imaging unit including a pixel not having a polarization characteristic is interposed between a first imaging unit and a second imaging unit including a pixel having a polarization characteristic for each of a plurality of polarization directions. A depth map is generated from a viewpoint of the first imaging unit by matching processing using a first image generated by the first imaging unit and a second image generated by the second imaging unit. A normal map is generated on the basis of a polarization state of the first image. Integration processing of the depth map and the normal map is performed and a depth map with a high (Continued)

accuracy is generated. The depth map generated by the map integrating unit is converted into a map from a viewpoint of the third imaging unit, and an image free from deterioration can be generated.

13 Claims, 31 Drawing Sheets

(51) Int. Cl.
  *G03B 35/26* (2021.01)
  *H04N 5/222* (2006.01)
  *G01B 11/24* (2006.01)
  *G03B 35/10* (2021.01)
  *H04N 5/225* (2006.01)
  *H04N 9/04* (2006.01)
  *H04N 13/133* (2018.01)
  *H04N 13/243* (2018.01)
  *H04N 13/282* (2018.01)
  *H04N 13/00* (2018.01)

(52) U.S. Cl.
  CPC .......... *G03B 35/26* (2013.01); *H04N 5/2226* (2013.01); *H04N 5/2258* (2013.01); *H04N 9/04557* (2018.08); *H04N 13/133* (2018.05); *H04N 13/243* (2018.05); *H04N 13/282* (2018.05); *H04N 2013/0081* (2013.01); *H04N 2213/001* (2013.01)

(56) References Cited

U.S. PATENT DOCUMENTS

2010/0289878 A1* 11/2010 Sato ............... H04N 13/239
  348/46
2012/0075432 A1  3/2012 Bilbrey et al.
2015/0234150 A1* 8/2015 Katsunuma ........ H04N 5/2254
  348/360

FOREIGN PATENT DOCUMENTS

| | | |
|---|---|---|
| CN | 104350732 A | 2/2015 |
| JP | 2012-143363 | 8/2012 |
| WO | WO2009/051065 A1 | 4/2009 |
| WO | WO2009/147814 A1 | 12/2009 |
| WO | WO2013/179620 A1 | 12/2013 |

OTHER PUBLICATIONS

Nov. 5, 2019, Japanese Office Action issued for related JP Application No. 2017-501865.

* cited by examiner

FIG. 17
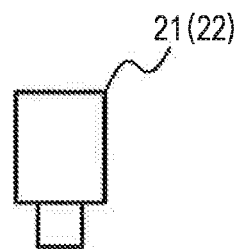
(a)
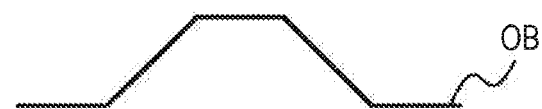
(b) 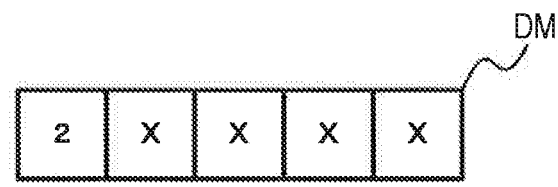
(c) 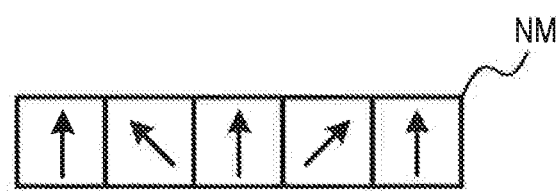
(d) 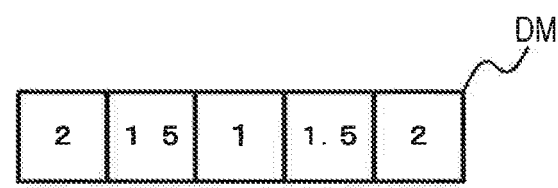

FIG. 29
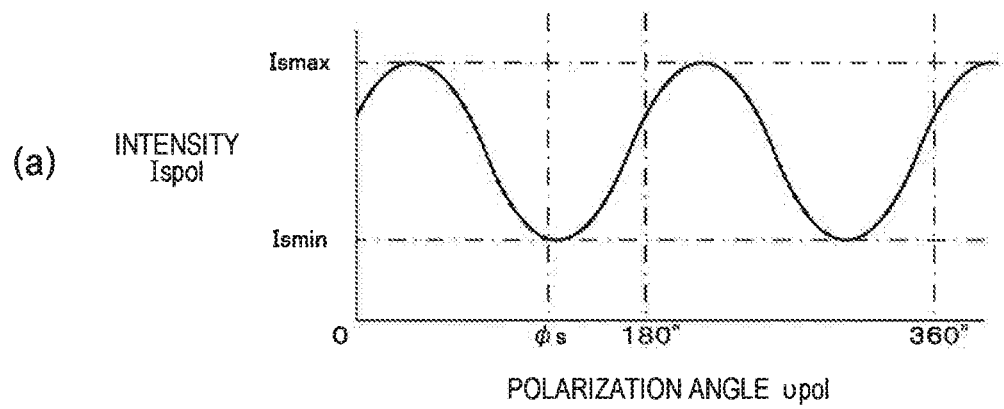
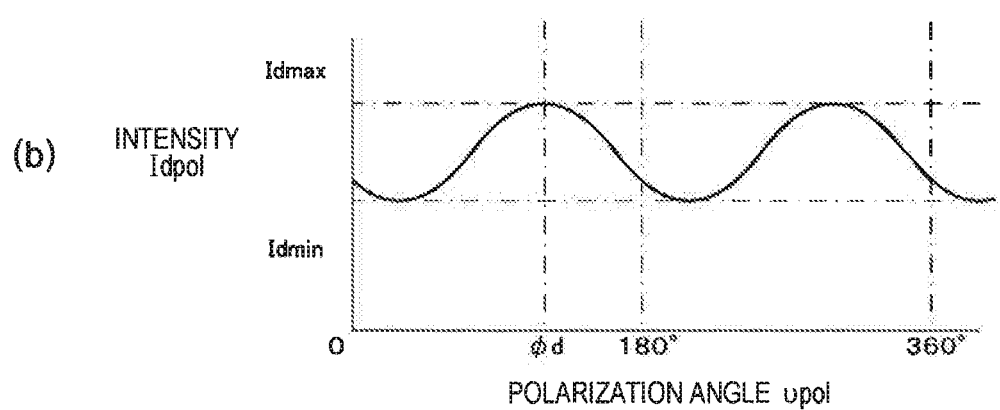

IMAGING DEVICE, IMAGE PROCESSING DEVICE AND IMAGE PROCESSING METHOD

CROSS REFERENCE TO RELATED APPLICATIONS

This application is a continuation of U.S. patent application Ser. No. 15/540,396 (filed on Jun. 28, 2017), which is a National Stage Patent Application of PCT International Patent Application No. PCT/JP2015/084401 (filed on Dec. 8, 2015) under 35 U.S.C. § 371, which claims priority to Japanese Patent Application No. 2015-C38165 (filed on Feb. 27, 2015), which are all hereby incorporated by reference in their entirety.

TECHNICAL FIELD

The present technology relates to an imaging device, an image processing device, and an image processing method and enables generation of an image in which deterioration of an image quality and intensity is suppressed and a depth map with a high accuracy.

BACKGROUND ART

In recent years, due to price reduction of 3D printers and other reasons, a means to easily acquire a three-dimensional shape is desired.

Means to acquire a three-dimensional shape of an object include an active method and a passive method. An active method for example irradiates an object with light and acquires a three-dimensional shape on the basis of reflection light from the object. This is not an easy method from the perspectives of power consumption or costs of parts. Contrarily to the active method, a passive method acquires a three-dimensional shape without irradiating an object with light. This is an easier method as compared to the active method. Passive methods include methods to generate a depth map by deriving correspondence between images using a stereo camera and methods to generate a normal map by acquiring a polarized image of a plurality of directions, for example.

A disadvantage is known in the passive method that the method using a stereo camera cannot acquire a depth of a flat part of an object. Meanwhile in the method using a polarized image of a plurality of directions, it is known that a relative surface shape of an object can be acquired but not an absolute distance. Furthermore, in the method using a polarized image of a plurality of directions, it is known that an azimuth angle of a normal of an object has ambiguity of 180 degrees. In Patent Document 1, therefore, by arranging polarizers having different polarization directions at each pixel of a solid state imaging element mounted to individual cameras of a stereo camera, acquisition of a depth map by the stereo camera and acquisition of a normal map by polarization imaging are performed concurrently. Furthermore, Patent Document 1 describes that referring to a depth map allows ambiguity of 180 degrees of a normal map to be solved and an absolute distance to be acquired.

CITATION LIST

Patent Document

Patent Document 1: International Publication No. 2009-147814

SUMMARY OF THE INVENTION

Problems to be Solved by the Invention

Meanwhile, in a case where there are four polarization directions in a polarizer arranged at each pixel of a solid state imaging element, the number of pixels of a polarized image in a particular direction is reduced to one-fourth of that of the original solid state imaging element and thus an image quality is disadvantageously deteriorated. Also, since a polarizer is attached to each pixel, an amount of light reaching a solid state imaging element is reduced and thus an image acquired becomes dark although ranging can be performed.

Therefore, an object of the present technology is to provide an imaging device, an image processing device, and an image processing method capable of generating an image in which an image quality and intensity are not deteriorated and a depth map with a high accuracy.

Solutions to Problems

A first aspect of the present technology is an imaging device including: a first imaging unit and a second imaging unit including a pixel having a polarization characteristic for each of a plurality of polarization directions; and a third imaging unit including a pixel not having a polarization characteristic and interposed between the first imaging unit and the second imaging unit.

In the present technology, the first imaging unit and the second imaging unit including a pixel having a polarization characteristic for each of a plurality of polarization directions and a third imaging unit including a pixel not having a polarization characteristic and interposed between the first imaging unit and the second imaging unit. The first imaging unit, the second imaging unit, and the third imaging unit are matched in terms of vertical and horizontal directions. An optical axis position of the third imaging unit is positioned on a line connecting optical axis positions of the first imaging unit and the second imaging unit. Moreover, the first imaging unit, the second imaging unit, and the third imaging unit are included such that entrance pupils thereof are positioned on the same line perpendicular to optical axis directions thereof, for example.

In a case where the first imaging unit and the second imaging unit are provided to an adaptor, for example, attached to the third imaging unit in an attachable and detachable manner, a position adjusting mechanism for matching vertical and horizontal directions of the first imaging unit and the second imaging unit to those of the third imaging unit are further provided to one of the adaptor and the third imaging unit. A communication unit is further included to enable the first imaging unit and the second imaging unit to perform communication with a main body unit which uses the first image and the second image. Furthermore, the third imaging unit has a larger number of pixels than that of the first imaging unit and the second imaging unit.

A second aspect of the present technology is an image processing device, including:

a map integrating unit for generating an integrated depth map obtained by integration processing of a depth map, generated using a first image generated by a first imaging unit including a pixel having a polarization characteristic for each of a plurality of polarization directions and a second image generated by a second imaging unit having a configuration equivalent to that of the first imaging unit, and a normal map based on a polarization state of the first image generated by the first imaging unit; and a viewpoint converting unit for converting the integrated depth map generated by the map integrating unit into a map from a viewpoint of a third imaging unit interposed between the first imaging unit and the second imaging unit, the third imaging unit including a pixel having no polarization characteristic.

Moreover, a third aspect is an image processing device, including:

a depth map generating unit for generating a depth map from a viewpoint of a first imaging unit by performing matching processing using a first image generated by the first imaging unit including a pixel having a polarization characteristic for each of a plurality of polarization directions and a second image generated by a second imaging unit having a configuration equivalent to that of the first imaging unit;

a normal map generating unit for generating a normal map on the basis of a polarization state of the first image generated by the first imaging unit;

a map integrating unit for generating an integrated map by performing integration processing of the depth map generated by the depth map generating unit and the normal map generated by the normal map generating unit; and a viewpoint converting unit for converting the integrated map generated by the map integrating unit or the depth map generated by the depth map generating unit and the normal map generated by the normal map generating unit into a map from a viewpoint of a third imaging unit interposed between the first imaging unit and the second imaging unit, the third imaging unit including a pixel having no polarization characteristic.

In the present technology, matching processing is performed using the first image generated by the first imaging unit including a pixel having a polarization characteristic for each of a plurality of polarization directions and the second image generated by the second imaging unit having a configuration equivalent to that of the first imaging unit and a depth map from a viewpoint of the first imaging unit is thus generated. Furthermore, a normal map is generated on the basis of a polarization state of the first image generated by the first imaging unit, for example on the basis of intensity of the first image having three or more polarization directions.

The depth map generated by the depth map generating unit and the normal map generated by the normal map generating unit are subjected to integration processing to calculate a depth value not represented in the depth map from a surface shape of an object determined on the basis of a depth value represented in the depth map and the normal map. As a result of this, a depth map having an accuracy higher than or equal to that of the depth map generated by the depth map generating unit.

Furthermore, viewpoint converting processing to convert the depth map generated by the map integrating unit or the depth map generated by the depth map generating unit and the normal map generated by the normal map generating unit into a map from a viewpoint of the third imaging unit including pixels having no polarization characteristic is performed and thereby a depth map with a high accuracy from a viewpoint of the third imaging unit is generated.

A map converting unit for converting the depth map into a map of a large number of pixels is further included. In a case where the third imaging unit has a larger number of pixels than those of the first imaging unit and the second imaging unit, the map converting unit converts the depth map from a viewpoint of the third imaging unit after the integration processing into a depth map corresponding to a resolution of an image generated by the third imaging unit. Moreover, in a case where the first and the second images are in colors, separation or the extraction of a reflection component from the first image is performed and the normal map is generated on the basis of a polarization state of an image after the separation or the extraction. Alternatively, the first and the second images may be in black and white.

A fourth aspect of the present technology is an image processing method, including the steps of:

generating, by a map integrating unit, an integrated depth map obtained by integration processing of a depth map, generated using a first image generated by a first imaging unit including a pixel having a polarization characteristic for each of a plurality of polarization directions and a second image generated by a second imaging unit having a configuration equivalent to that of the first imaging unit, and a normal map based on a polarization state of the first image generated by the first imaging unit; and converting, by a viewpoint converting unit, the generated integrated depth map into a map from a viewpoint of a third imaging unit interposed between the first imaging unit and the second imaging unit, the third imaging unit including a pixel having no polarization characteristic.

Effects of the Invention

According to the present technology, the first imaging unit and the second imaging unit including a pixel having a polarization characteristic for each of a plurality of polarization directions and a third imaging unit including a pixel not having a polarization characteristic and interposed between the first imaging unit and the second imaging unit are included. Also, by matching processing using a first image generated by the first imaging unit and a second image generated by the second imaging unit having a configuration equivalent to that of the first imaging unit, a depth map from a viewpoint of the first imaging unit is generated. Furthermore, a normal map is generated on the basis of a polarization state of the first image generated by the first imaging unit. A depth map of a high accuracy is then generated by integration processing of the generated depth map and the normal map. Thereafter, the depth map after integration processing or the depth map before integration processing and the normal map are converted into a map from a viewpoint of the third imaging unit interposed between the first imaging unit and the second imaging unit. As a result of this, an image free from deterioration of an image quality and intensity and a depth map with a high accuracy corresponding to the image can be generated. Note that effects described herein are merely examples and thus are not limiting. Additional effects may also be further included.

BRIEF DESCRIPTION OF DRAWINGS

FIG. 17 is a diagram for explaining integration processing of maps.

FIG. 29 is a diagram illustrating relation between the intensity and the polarization angle (in the case of mirror surface reflection).

MODE FOR CARRYING OUT THE INVENTION

Embodiments implementing the present technology will be described below. Note that explanation will be given in the order below.

Figure 1:
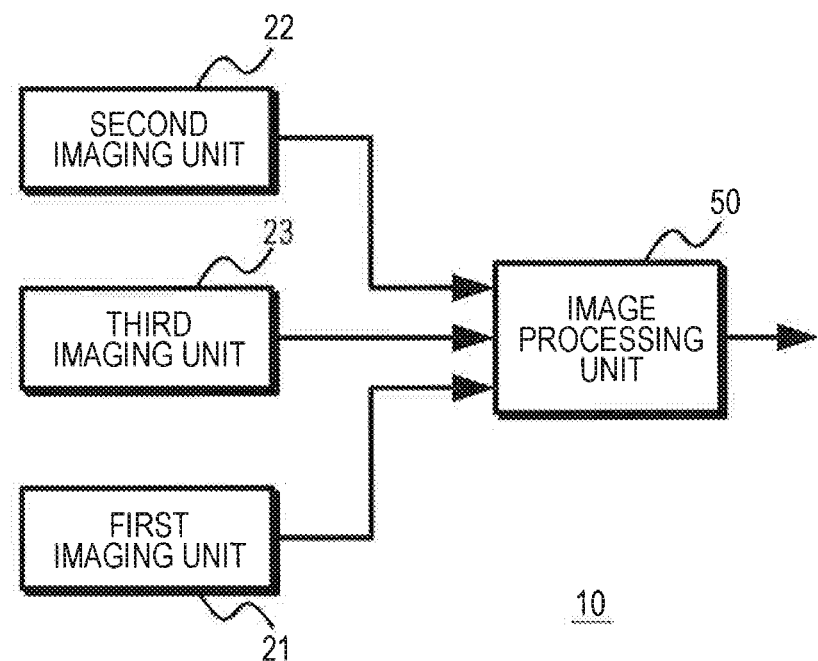
FIG. 1 is a block diagram illustrating a configuration of an imaging device.

1. About imaging device
2. Arrangement and configuration of imaging unit
3. Configuration and operation of image processing unit
3-1. Configuration and operation of first embodiment
3-2. Configuration and operation of second embodiment
3-3. Configuration and operation of third embodiment
4. Other embodiments of imaging unit and image processing unit
5. Exemplary application 1. About Imaging Device FIG. 1 is a block diagram illustrating a configuration of an imaging device of the present technology. An imaging device 10 includes a first imaging unit 21, a second imaging unit 22, a third imaging unit 23, and an image processing unit 50. The first imaging unit 21 and the second imaging unit 22 include a pixel having a polarization characteristic for each of a plurality of polarization directions, generate an image signal of a polarized image, and output to the image processing unit 50. The third imaging unit 23 includes a pixel not having a polarization characteristic, generates an image signal of a non-polarized image, and outputs to the image processing unit 50. The image processing unit 50 generates a depth map from the polarized image generated by the first imaging unit 21 and the second imaging unit 22. The image processing unit 50 further converts the generated depth map into a depth map corresponding to the non-polarized image generated by the third imaging unit 23. The image processing unit 50 may be integrally provided with the first imaging unit 21, the second imaging unit 22, and the third imaging unit 23, or, alternatively, may be provided separately from the first imaging unit 21, the second imaging unit 22, and the third imaging unit 23.

2. Arrangement and Configuration of Imaging Unit

Figure 2:
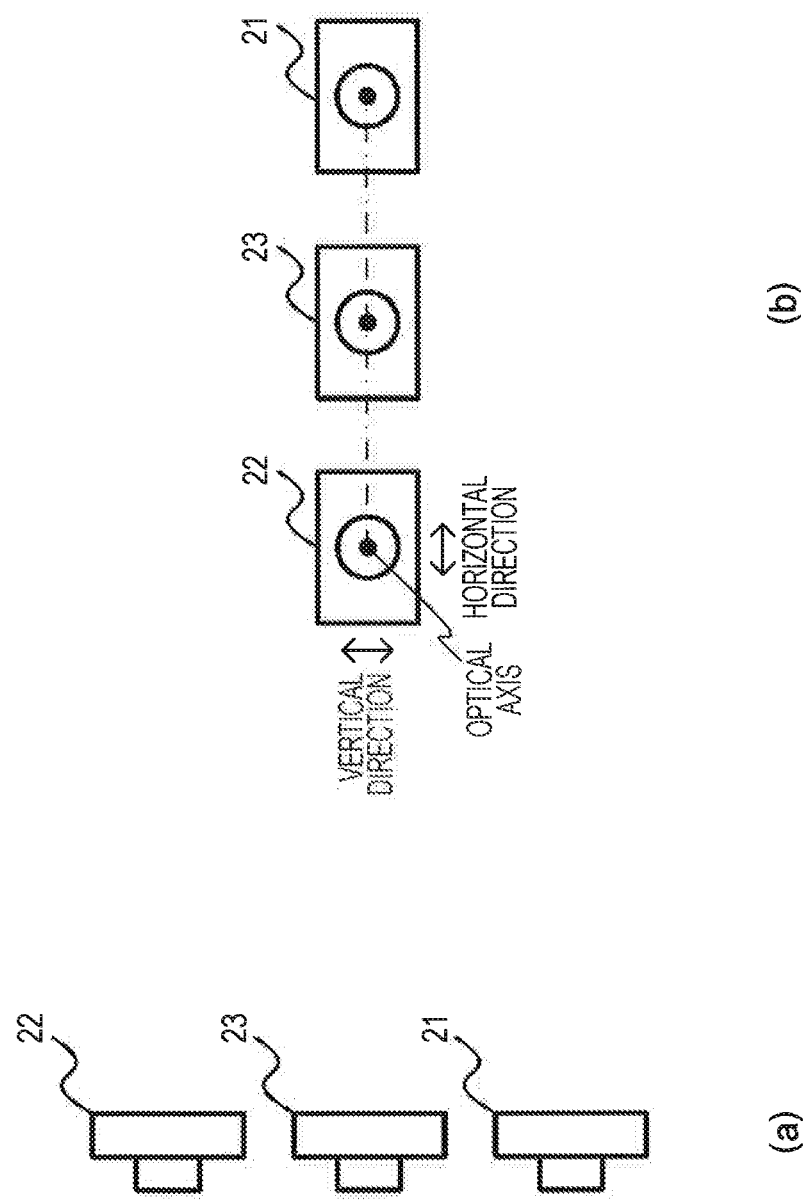
FIG. 2 is a diagram illustrating positional relation among a first imaging unit, a second imaging unit, and a third imaging unit.

FIG. 2 is a diagram illustrating positional relation among the first imaging unit, the second imaging unit, and the third imaging unit. Note that (a) of FIG. 2 is a diagram illustrating a view seen from an upper side direction and (b) of FIG. 2 is a diagram illustrating a view seen from a front side direction.

The third imaging unit 23 not arranged with a polarizer is interposed between the first imaging unit 21 and the second imaging unit 23 arranged with the polarizer. The first imaging unit 21, the second imaging unit 22, and the third imaging unit 23 are matched in terms of vertical and horizontal directions. For example, an optical axis position of the third imaging unit is positioned on a line connecting optical axis positions of the first imaging unit and the second imaging unit.

Figure 3:
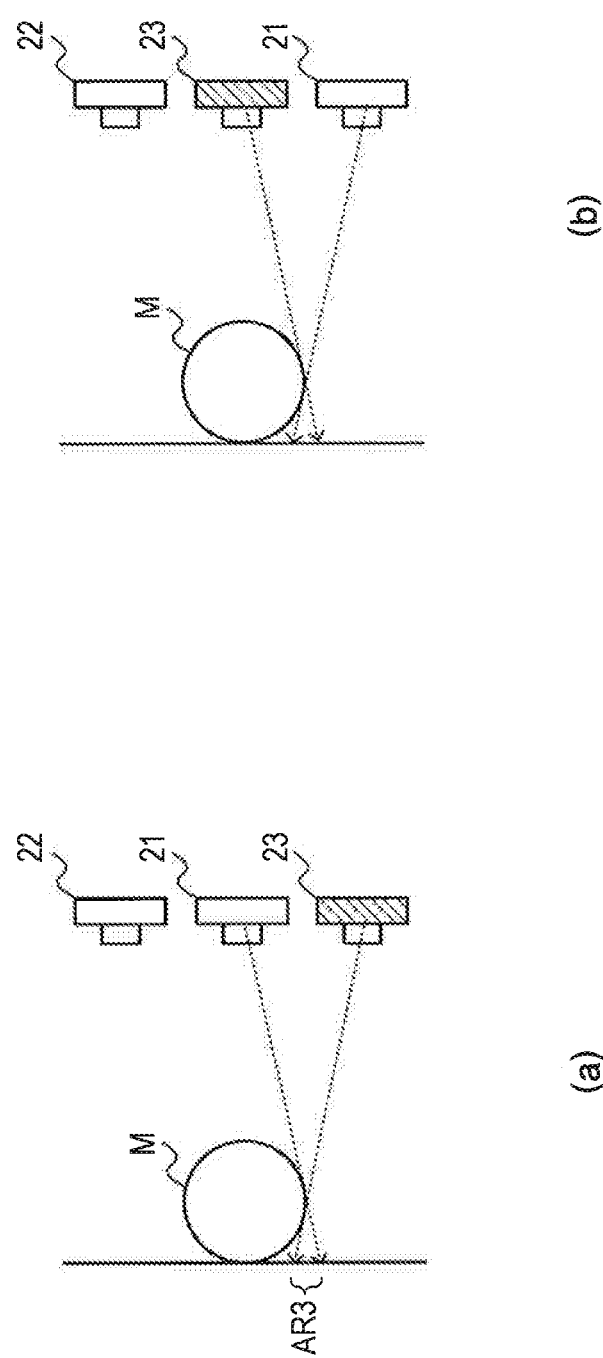
FIG. 3 is a diagram for explaining a difference between a case where the third imaging unit is interposed between the first imaging unit and the second imaging unit and a case of being provided on an outer side.

FIG. 3 is a diagram for explaining a difference between a case where the third imaging unit is interposed between the first imaging unit and the second imaging unit and a case of being provided on an outer side. When the third imaging unit 23 is provided at the outer side from the first imaging unit 21 and the second imaging unit 22 as illustrated in (a) of FIG. 3, an area AR3 which can be imaged by the third imaging unit 23 corresponds to a shadow of an object M in captured images of the first imaging unit 21 and the second imaging unit 22. Therefore, in a case where viewpoint conversion of converting a depth map from a viewpoint of the first imaging unit 21 into that from a viewpoint of the third imaging unit 23 is performed as described later, a depth value of the area AR3 becomes invalid. When the third imaging unit 23 is interposed between the first imaging unit 21 and the second imaging unit 22 as illustrated in (b) of FIG. 3, however, an area which can be imaged by the third imaging unit 23 can be imaged by one of the first imaging unit 21 and the second imaging unit 22. Therefore, the angle of view and other parameters of the first imaging unit 21 and the second imaging unit 22 are set such that an imaging range of the third imaging unit 23 can be imaged by one of the first imaging unit 21 and the second imaging unit 22 when a desired object is imaged by the third imaging unit 23. Arranging the first imaging unit, the second imaging unit, and the third imaging unit in this manner allows a depth value of an area imaged by the third imaging unit 23 to be calculated from the polarized image generated by the first imaging unit 21 or the second imaging unit 22. Therefore, a depth map of the desired object can be generated with a preferable accuracy as described later. Moreover, by interposing the third imaging unit between the first imaging unit and the second imaging unit, occurrence of occlusion can be suppressed to the minimum.

Figure 4:
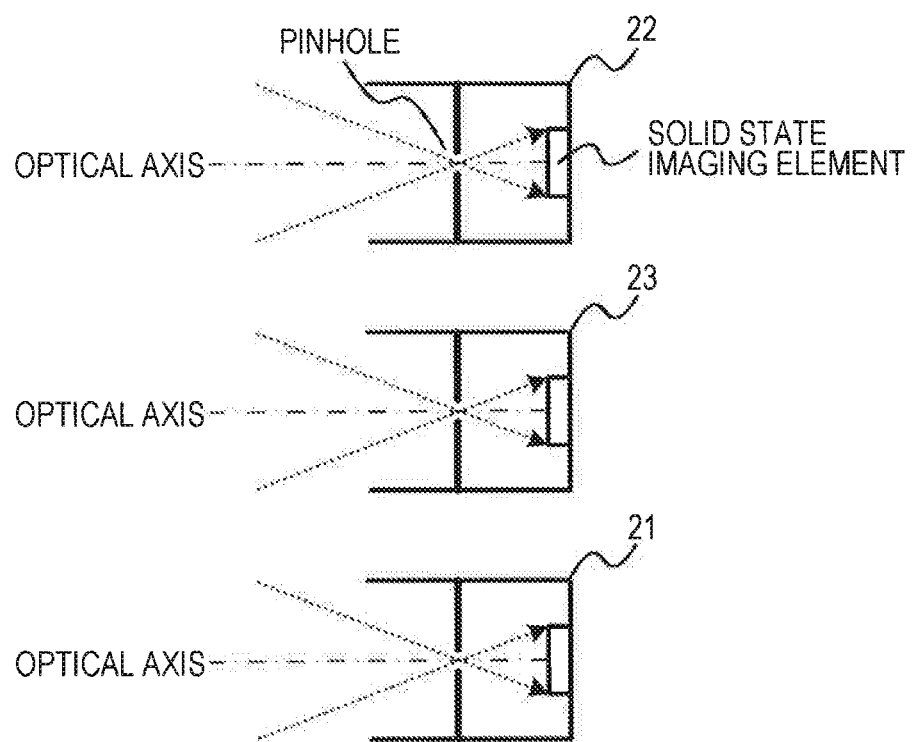
FIG. 4 is a diagram schematically illustrating ideal arrangement of the first imaging unit, the second imaging unit, and the third imaging unit.

FIG. 4 is a diagram schematically illustrating ideal arrangement of the first imaging unit, the second imaging unit, and the third imaging unit. Note that, for simplicity of descriptions, an imaging unit is assumed as a pinhole camera. Also, an axis passing through a pinhole and is perpendicular to an imaging surface of a solid state imaging element is regarded as an optical axis of an imaging unit.

It is preferable that the first imaging unit 21, the second imaging unit 22, and the third imaging unit 23 are arranged such that central positions (pinhole positions) of the imaging units are aligned on the same linear line perpendicular to the optical axes of the respective imaging units.

Figure 5:
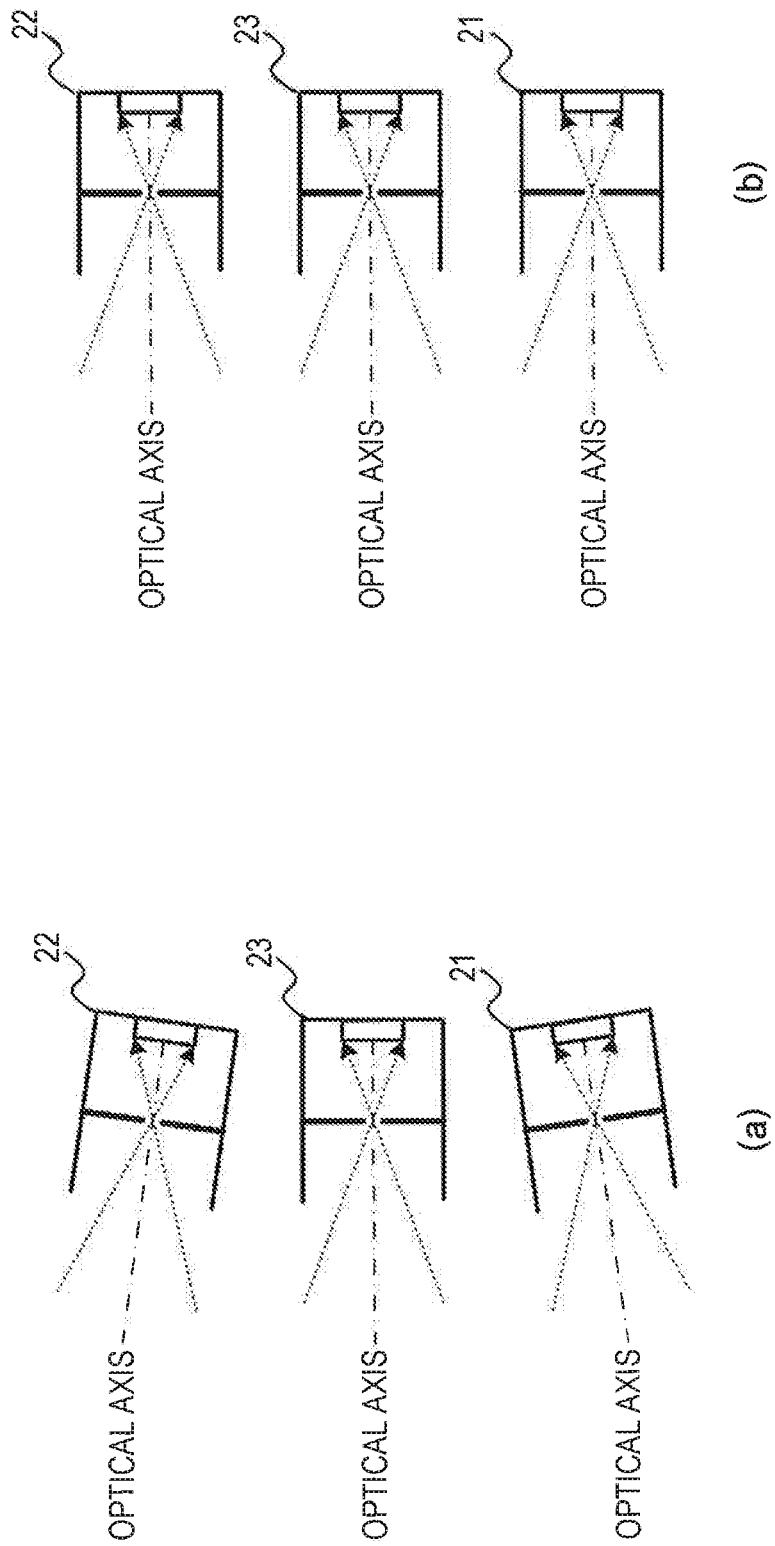
FIG. 5 is a diagram for explaining a case where optical axis directions of the first imaging unit, the second imaging unit, and the third imaging unit vary.

Moreover, if the central positions of the imaging units are arranged on the same linear line, even when optical axis directions of the first imaging unit, the second imaging unit, and the third imaging unit vary, an image equivalent to that of a case where the optical axis directions match with each other can be generated. In (a) of FIG. 5, a case where optical axis directions of the first imaging unit, the second imaging unit, and the third imaging unit vary is exemplified. In this case, geometric conversion is performed using an angular difference between the optical axis direction of the first imaging unit 21 and the optical axis direction of the third imaging unit 23 as a rotation angle and the central position of the first imaging unit 21 as a reference. Geometric conversion is further performed using an angular difference between the optical axis direction of the second imaging unit 21 and the optical axis direction of the third imaging unit 23 as a rotation angle and the central position of the second imaging unit 21 as a reference. By performing such processing, conversion into an image captured in a state where the optical axes of the first imaging unit 21, the second imaging unit 22, and the third imaging unit 23 are parallel and the central positions of the respective imaging units are aligned on the same linear line perpendicular to the optical axes is enabled as illustrated in (b) of FIG. 5.

Figure 6:
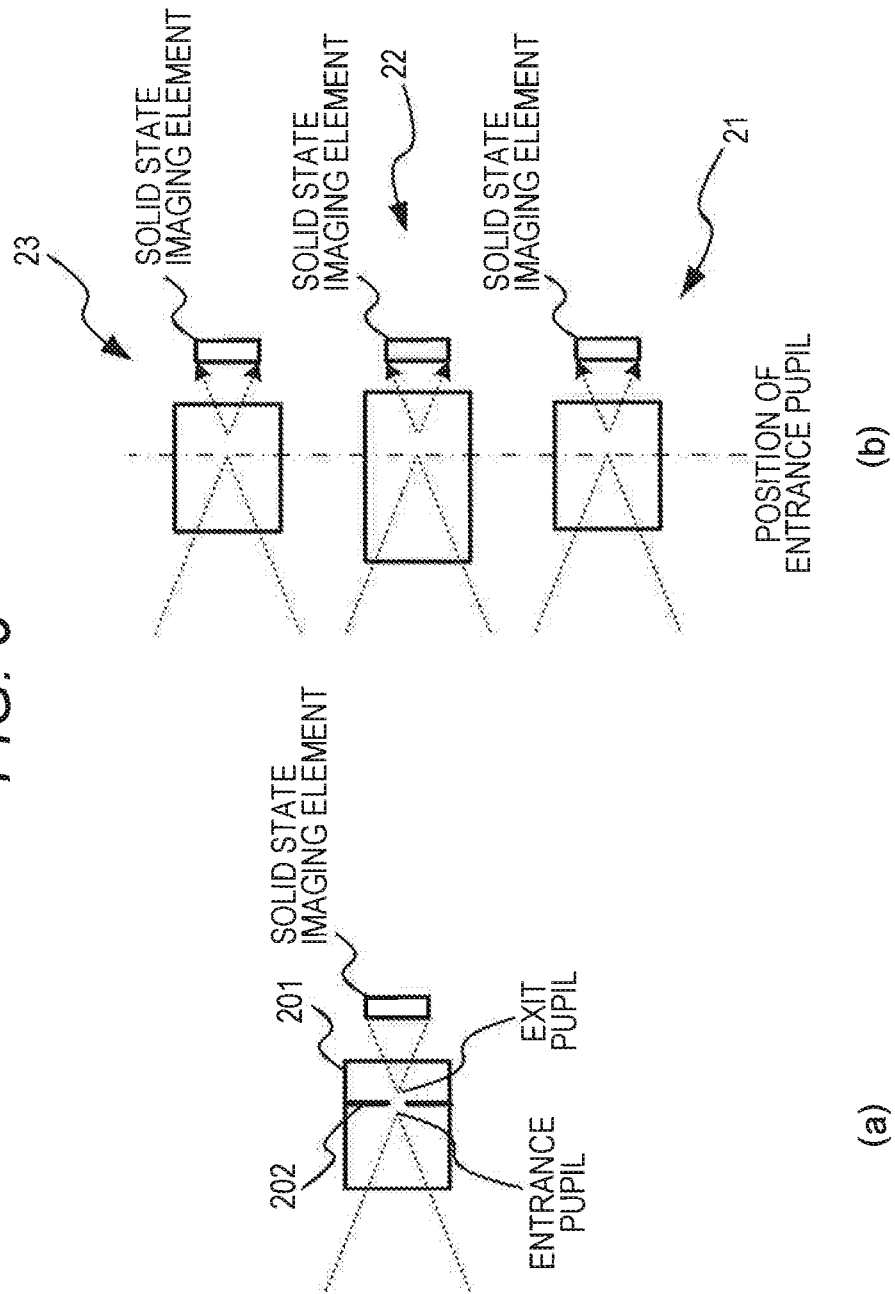
FIG. 6 is a diagram exemplifying arrangement in a case where an imaging unit including a diaphragm at a lens unit thereof is used.

FIG. 6 is a diagram exemplifying arrangement in a case where an imaging unit including a diaphragm at a lens unit thereof is used. In (a) of FIG. 6, a lens unit 201 is provided with a diaphragm 202 and an incident side of the diaphragm 202 forms an entrance pupil. In a case where such a lens unit is included in the first imaging unit 21, the second imaging unit 22, and the third imaging unit 23, they are arranged such that positions of entrance pupils match each other as illustrated in (b) of FIG. 6.

Figure 7:
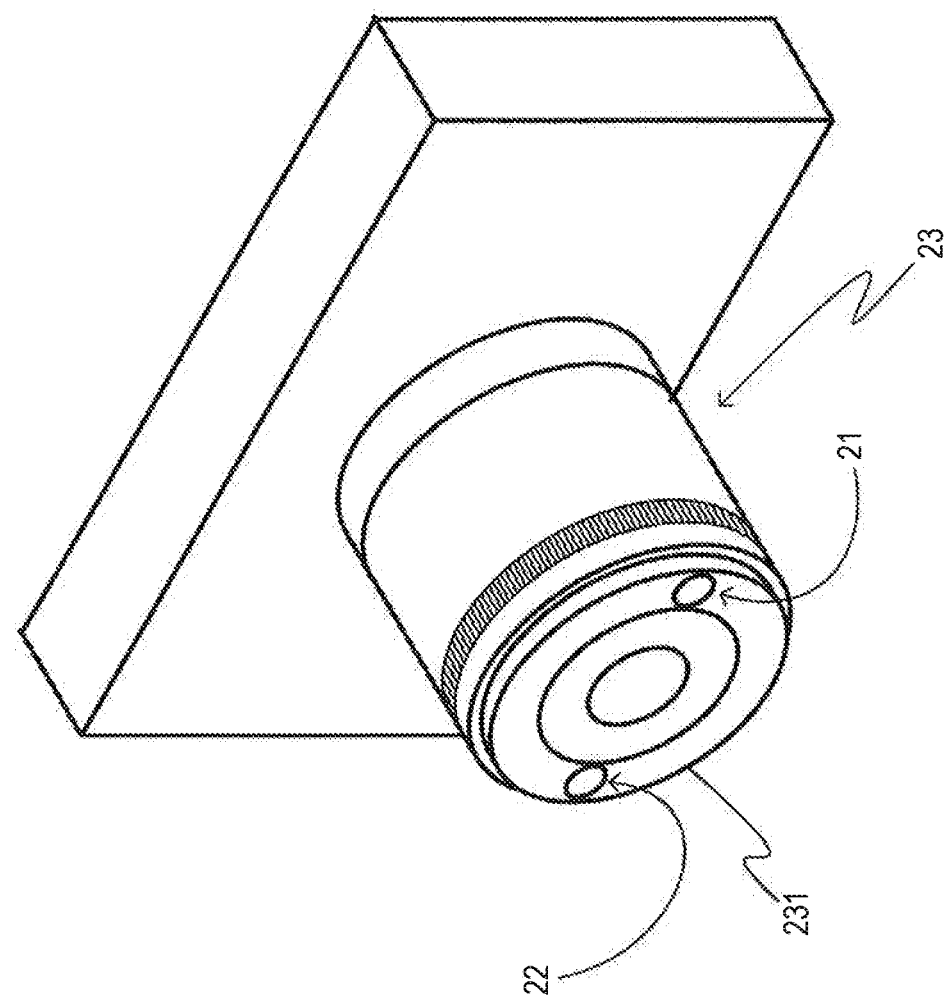
FIG. 7 is a diagram exemplifying specific arrangement of the first imaging unit, the second imaging unit, and the third imaging unit.

FIG. 7 is a diagram exemplifying specific arrangement of the first imaging unit, the second imaging unit, and the third imaging unit. The third imaging unit 23 is formed by a lens unit 231, a solid state imaging element (not illustrated), and other components. A left side (right side) of a front surface of the lens unit 231 is provided with the first imaging unit 21 while a right side (left side) of the front surface is provided with the second imaging unit 22. In this manner, providing imaging units on the right and the left of the front surface of the lens unit 231 results in the positional relation of the first imaging unit, the second imaging unit, and the third imaging unit illustrated in FIG. 2.

Figure 8:
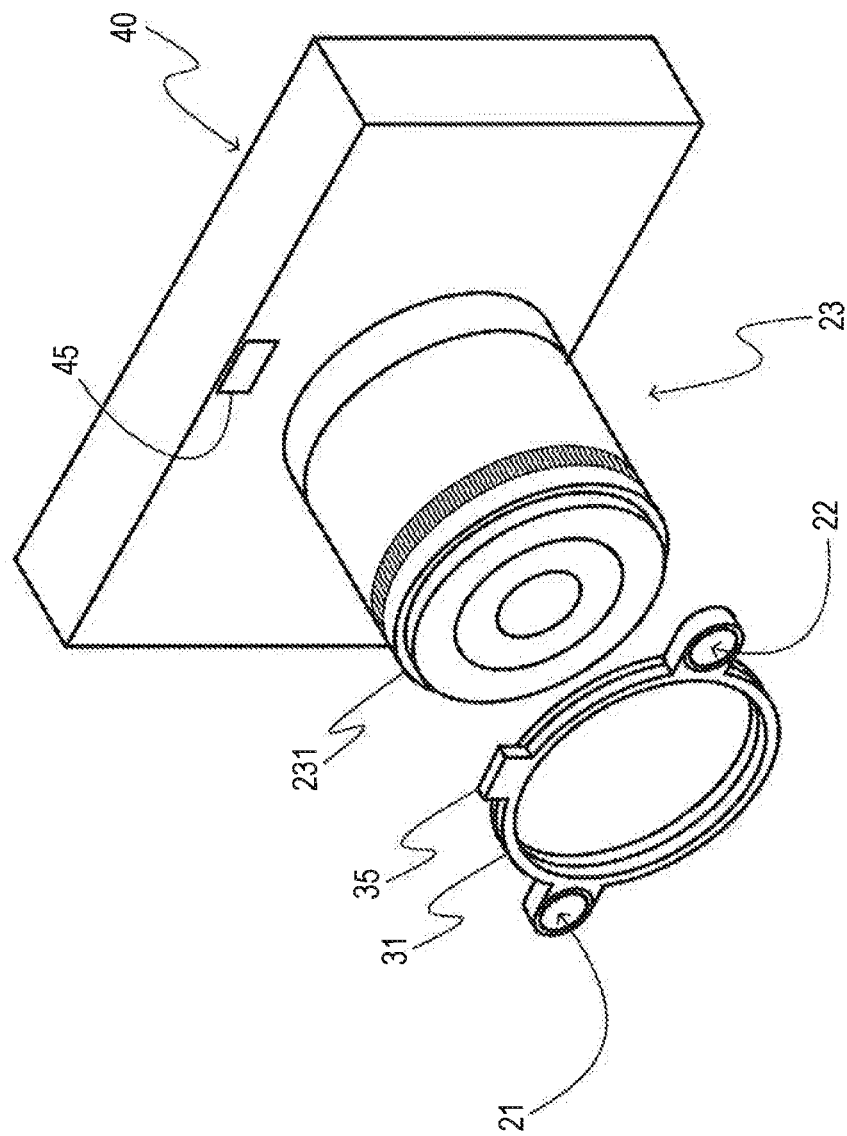
FIG. 8 is a diagram exemplifying other specific arrangement of the first imaging unit, the second imaging unit, and the third imaging unit.

FIG. 8 is a diagram exemplifying other specific arrangement of the first imaging unit, the second imaging unit, and the third imaging unit. The third imaging unit 23 is formed by a lens unit 231, a solid state imaging element (not illustrated), and other components. In this example, an adaptor 31 is attachable to and detachable from the lens unit 231 and the first imaging unit 21 and the second imaging unit 22 are provided to side surfaces of the adaptor 31 in a protruding manner. Moreover, the first imaging unit 21 and the second imaging unit 22 are arranged such that the first imaging unit, the second imaging unit, and the third imaging unit have the positional relation illustrated in FIG. 2 when the adaptor 31 is mounted to the lens unit 231.

The adaptor 31 is formed by, for example, a fixing ring for fixing the lens unit 231 to the adaptor 31, and a movable ring held in a rotatable manner in a circumferential direction of the fixing ring with respect to the fixing ring. The movable ring is fixed with the first imaging unit 21 and the second imaging unit 22 at diagonal positions on the basis of a rotation axis of the movable ring.

Figure 9:
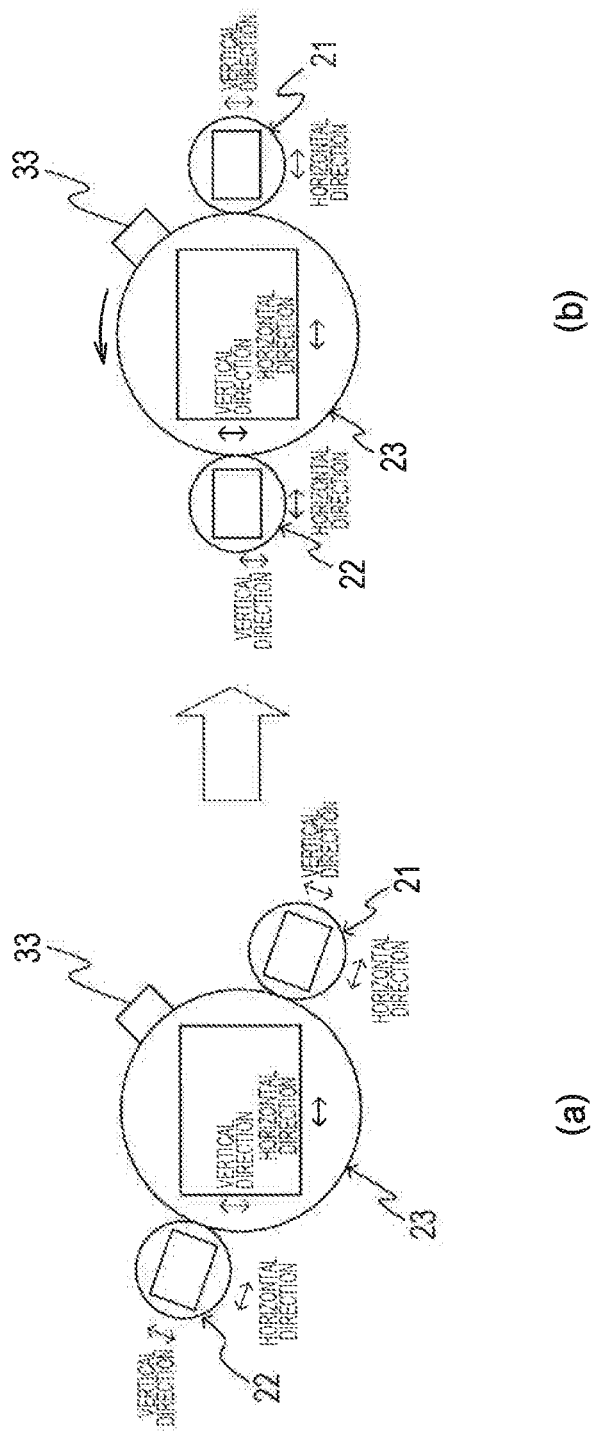
FIG. 9 is a diagram illustrating a case where the first imaging unit and the second imaging unit are attached to a lens unit of the third imaging unit via an adaptor.

FIG. 9 is a diagram illustrating a case where the first imaging unit and the second imaging unit are attached to a lens unit of the third imaging unit via the adaptor. When the adaptor 31 attached to the lens unit 231 rotates about an optical axis of the lens unit 231 upon operation of the lens unit 231, vertical and horizontal directions of the first imaging unit 21 and the second imaging unit 22 may be different from vertical and horizontal directions of the third imaging unit 23 as illustrated in (a) of FIG. 9. Therefore, images generated by the first imaging unit 21 and the second imaging unit 22 may be disadvantageously inclined with respect to an image generated by the third imaging unit 23. Therefore, as illustrated in (b) of FIG. 9, for example a position adjusting mechanism 33 is provided to the adaptor 31 and the movable ring is rotated to maintain a state where vertical and horizontal directions of the first imaging unit 21 and the second imaging unit 22 match the vertical and horizontal directions of the third imaging unit 23 even when the adaptor 31 rotates. The position adjusting mechanism 33 is formed by, for example, a driving unit which drives the movable ring in a circumferential direction of the fixing ring, a position detecting sensor which detects positional relation between the lens unit 231 and the movable ring, and other components. The driving unit drives the movable ring on the basis of a detection result of the position detecting sensor such that a state where vertical and horizontal directions of the first imaging unit 21 and the second imaging unit 22 match those of the third imaging unit 23 is maintained. Using such an adaptor enables the third imaging unit to use an existing lens.

As illustrated in FIG. 8, the adaptor 31 provided with the first imaging unit 21 and the second imaging unit 22 is further provided with a communication unit 35 which performs communication between the first imaging unit 21 and the second imaging unit 22 and a main body unit which uses an image generated by the first imaging unit and an image generated by the second imaging unit. The communication unit 35 performs communication with a communication unit 45 included in the main body unit 40 for example and supplies an image signal of a polarized image generated by the first imaging unit 21 and the second imaging unit 22 to an image processing unit included in the main body unit 40. Note that the communication unit 45 may be included in the third imaging unit 23 without being limited to the main body unit 40. In this case, the first imaging unit 21 and the second imaging unit 22 performs communication with the image processing unit via the third imaging unit 23. Moreover, a communication method of the communication unit 35 and the communication unit 45 is not necessarily limited and may be any communication method compliant with the Wi-Fi standards, the Bluetooth (registered trademark) standards, or other standards.

Next, a configuration of the first imaging unit, the second imaging unit, and the third imaging unit will be described. The first imaging unit, the second imaging unit, and the third imaging unit are formed by a solid state imaging element such as a complementary metal oxide semiconductor (CMOS) or a charge coupled device (CCD). The first imaging unit and the second imaging unit further include a polarizer. As described later, a pixel having a polarization characteristic is included for each of a plurality of polarization directions to allow a polarization model formula representing relation between the polarization direction and the luminance change to be calculated from a polarized image.

Figure 10:
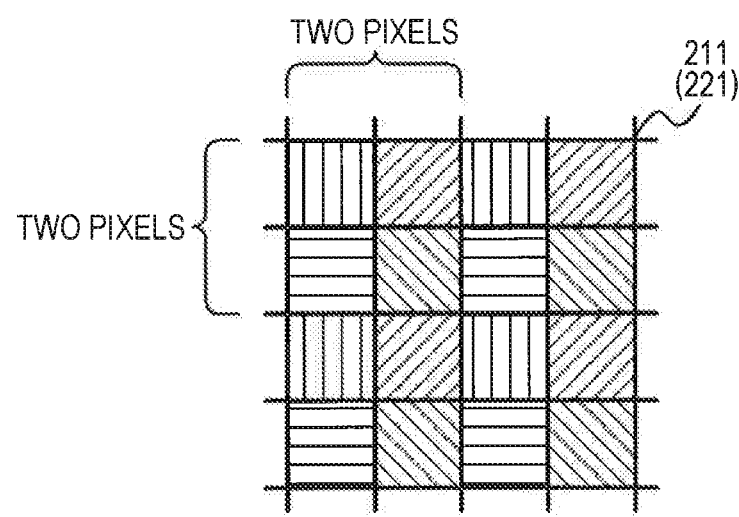
FIG. 10 is a diagram exemplifying a configuration of a polarizer used in the first imaging unit and the second imaging unit.

FIG. 10 is a diagram exemplifying a configuration of a polarizer used in the first imaging unit and the second imaging unit. A polarizer 211 used in the first imaging unit 21 and a polarizer 221 used in the second imaging unit 22 are configured such that pixel values of four different polarization directions can be obtained in an area of a unit of 2*2 pixels. Note that a polarization direction is represented by a direction of hatching lines in FIG. 10. The solid state imaging element used in the first imaging unit and the second imaging unit is not provided with a color filter and thus the first imaging unit and the second imaging unit generate an image signal of a polarized image of achromatic colors (black and white polarized image) and output to the image processing unit 50.

Figure 11:
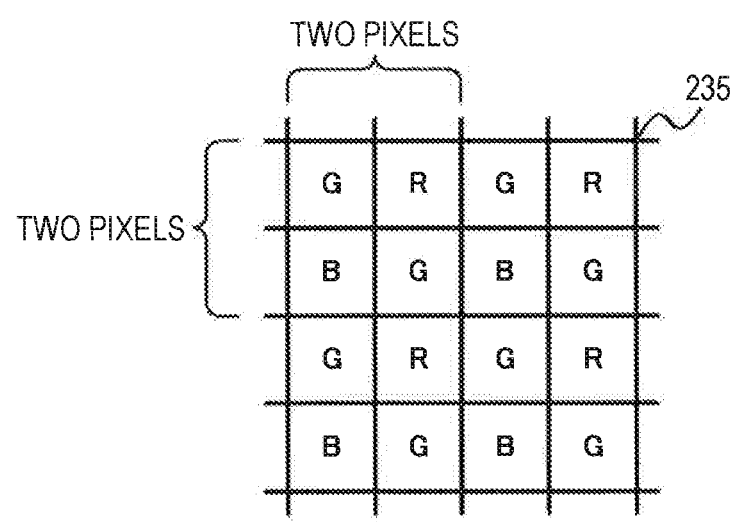
FIG. 11 is a diagram exemplifying pixel arrangement of a color filter used in the third imaging unit.

FIG. 11 is a diagram exemplifying pixel arrangement of a color filter used in the third imaging unit. The solid state imaging element used in the third imaging unit is provided with a color filter 235. For example, red color pixels (R), green color pixels (G), and blue color pixels (B) are arrayed into a Bayer array. The third imaging unit generates an image signal of a non-polarized image of three primary colors and outputs to the image processing unit 50. Moreover, the number of pixels of the third imaging unit may be equivalent to that of the first imaging unit and the second imaging unit or may be higher than that of the first imaging unit and the second imaging unit.

3. Configuration and Operation of Image Processing Unit

The image processing unit performs processing to generate a depth map from the polarized images generated by the first imaging unit and the second imaging unit. The image processing unit further performs processing to convert the generated depth map into a depth map corresponding to the non-polarized image generated by the third imaging unit.

3-1. Configuration and Operation of First Embodiment

Figure 12:
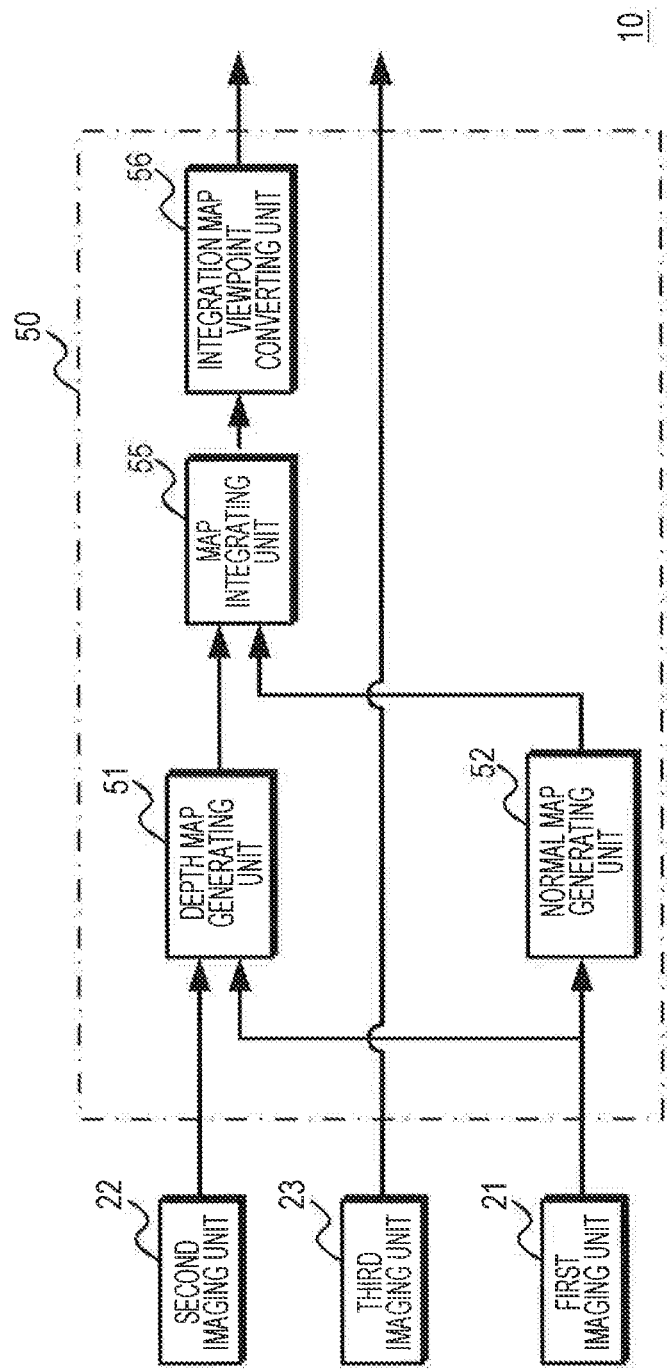
FIG. 12 is a diagram illustrating a configuration of a first embodiment of an image processing unit.

FIG. 12 is a diagram illustrating a configuration of a first embodiment of the image processing unit. The image processing unit 50 of the imaging device 10 includes a depth map generating unit 51, a normal map generating unit 52, a map integrating unit 55, and an integrated map viewpoint converting unit 56.

The depth map generating unit 51 performs stereo matching processing on the basis of the polarized image generated by the first imaging unit 21 and the polarized image generated by the second imaging unit 22 having a different viewpoint position from that of the first imaging unit 21 and thereby generates a depth map storing a depth value for each pixel. The depth map generating unit 51 outputs the generated depth map to the map integrating unit 55.

The depth map generating unit 51 generates a matching image used for matching processing from each of the polarized images supplied from the first imaging unit 21 and the second imaging unit 22. As described above, the polarized images supplied from the first imaging unit 21 and the second imaging unit 22 have a plurality of polarization directions and thus images of an object at the same position may have different polarization directions. Therefore, the depth map generating unit 51 generates the matching image so that matching processing can be performed without being influenced by a difference in the polarization direction. The depth map generating unit 51 performs, for example, filter processing on each of the polarized images supplied from the first imaging unit 21 and the second imaging unit 22 and generates a non-polarized image. In a case where the polarizer illustrated in FIG. 10 is used, the depth map generating unit 51 performs averaging filter processing on two pixels by two pixels, calculates an average value of pixel values of the four polarization directions, and thereby generates a pixel value of a non-polarized image. The depth map generating unit 51 uses, as a matching image, the non-polarized image obtained by performing filter processing on the polarized images supplied from the first imaging unit 21 and the second imaging unit 22. Alternatively, the depth map generating unit 51 may perform edge extracting processing on the non-polarized image obtained by performing filter processing on the polarized images supplied from the first imaging unit 21 and the second imaging unit 22 and use each of the obtained edge-extracted images as matching images. In a case where such edge-extracted images are used as matching images, the depth map generating unit 51 can perform matching processing without being influenced by a difference in the intensity level.

Figure 13:
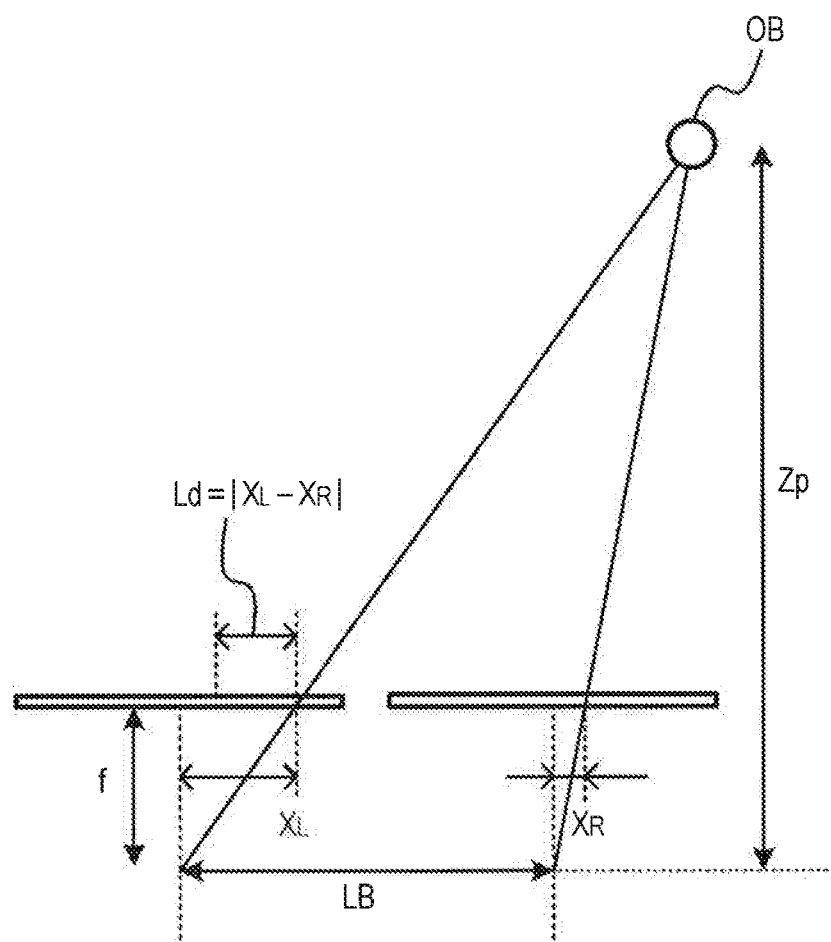
FIG. 13 is a diagram for explaining calculation of a distance to an object.

The depth map generating unit 51 further performs matching processing using the matching image. As a matching method, any method may be used such as area-based matching, characteristic-based matching, or template matching. The depth map generating unit 51 executes matching processing and calculates a distance to an object from each of the pixel positions (hereinafter referred to as "depth value") on the basis of a shift amount of a corresponding pixel position. FIG. 13 is a diagram for explaining calculation of a distance to an object. Note that FIG. 13 is a diagram exemplifying a case where the first imaging unit 21 and the second imaging unit 22 are arranged on the right and the left in the same attitude. Here, the imaging unit on the left side is regarded as a base imaging unit while the imaging unit on the right side is regarded as a reference imaging unit. Moreover, an interval (base length) between base positions of the imaging units is denoted as "LB" and a focal distance of the imaging unit is denoted as "f". In this case, when a position XR of the object in the reference imaging unit is shifted by "Ld" with respect to a position XL of the object in the base imaging unit, a distance "Zp" to the object can be calculated on the basis of mathematical formula (1).

[Mathematical Formula 1]

$$Zp = \frac{LB \times f}{Ld} \quad (1)$$

The depth map generating unit 51 generates a depth map by associating a distance (depth value) calculated for a captured image a normal map of which is generated by the normal map generating unit 52 to pixels of the captured image. For example in a case where the normal map generating unit 52 generates a normal map using a polarized image generated by the first imaging unit 21, the depth map generating unit 51 generates a depth map from a viewpoint of the first imaging unit 21 and outputs to the map integrating unit 55.

The normal map generating unit 52 generates a normal map from polarized images of a plurality of directions having different polarization directions. Note that normal information of a normal map is information from which a surface shape of an object can be acquired by integrating the normal information. A surface shape of an object includes a relative value but information related to a distance to the object.

Figure 14:
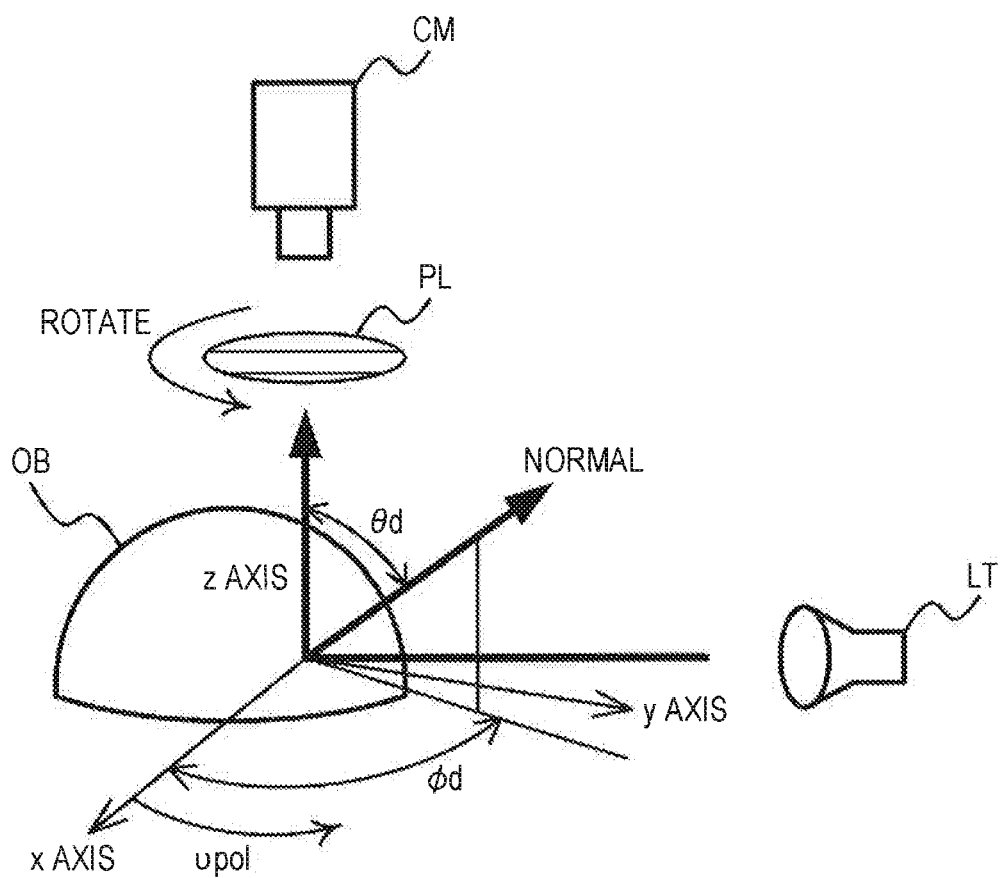
FIG. 14 is a diagram for explaining an intensity change of a polarized image.

The normal map generating unit 52 generates the normal map on the basis of the polarized image having a plurality of polarization directions supplied from the first imaging unit 21. FIG. 14 is a diagram for explaining an intensity change of a polarized image. As illustrated in FIG. 14, an object OB is illuminated using a light source LT and the object OB is imaged OB is imaged by an imaging unit CM via a polarizing plate PL. In this case, it is known that intensity of the object OB varies in accordance with rotation of the polarizing plate PL in a polarized image generated by the imaging unit CM. Here, the highest intensity when the polarizing plate PL is rotated is denoted as "Idmax" and the lowest intensity as "Idmin". Also, assuming an x axis and a y axis in a two dimensional coordinate as a plane direction of the polarizing plate PL, an angle with respect to the x axis on the xy plane when the polarizing plate PL is rotated is referred to as a polarization angle vpol. The polarizing plate PL has a cycle of 180 degrees and thus returns to the original polarization state when rotated by 180 degrees.

Figure 15:
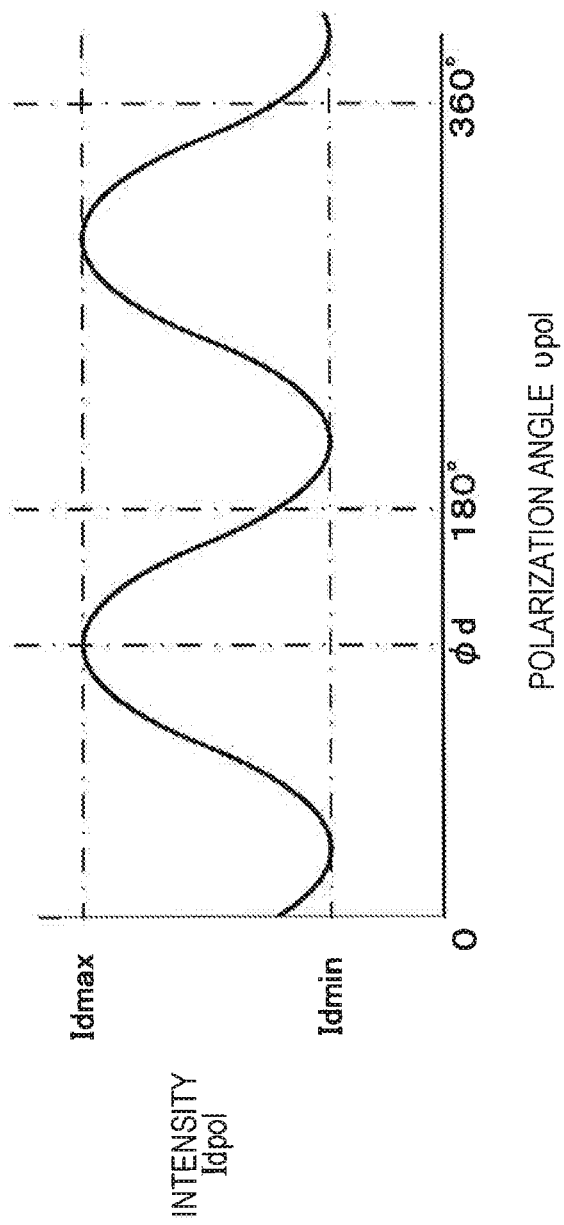
FIG. 15 is a diagram exemplifying relation between the intensity and the polarization angle (in the case of diffusion reflection).

FIG. 15 is a diagram exemplifying relation between the intensity and the polarization angle (in the case of diffusion reflection). A polarization angle vpol when the maximum intensity Idmax is observed is defined to as an azimuth angle φd. When such a definition is made, a polarization model formula representing a change of intensity Idpol observed when the polarizing plate PL is rotated, that is, a predetermined intensity change occurring due to a difference in polarization angle can be expressed as mathematical formula (2).

[Mathematical Formula 2]

$$I_{dpol} = \frac{I_{dmax} + I_{dmin}}{2} + \frac{I_{dmax} - I_{dmin}}{2} \cos 2(u_{pol} - \phi_d) \quad (2)$$

In mathematical formula (2), a polarization angle vpol is clear upon generation of a polarized image. The maximum intensity Idmax, the minimum intensity dImin, and the azimuth angle φd are variables. The normal map generating unit 52 thus performs fitting to the function expressed by mathematical formula (2) using the intensity of the polarized image having three or more polarization directions since there are three variables and thereby determines the azimuth angle φd with which the intensity becomes the largest on the basis of the polarization model formula representing relation between the intensity and the polarization angle.

Also, the object surface normal is expressed in a polar coordinate system. Normal information includes the azimuth angle φd and the zenith angle φd. Note that the zenith angle φd is an angle formed from the z axis toward a normal and the azimuth angle φd is an angle formed from the x axis in the y axis direction. Here, the degree of polarization ρd can be calculated by performing calculation of mathematical formula (3) also by using the minimum intensity Idmin and the maximum intensity Idmax obtained by rotating the polarizing plate PL.

[Mathematical Formula 3]

$$\rho_d = \frac{I_{dmax} - I_{dmin}}{I_{dmax} + I_{dmin}} \quad (3)$$

Figure 16:
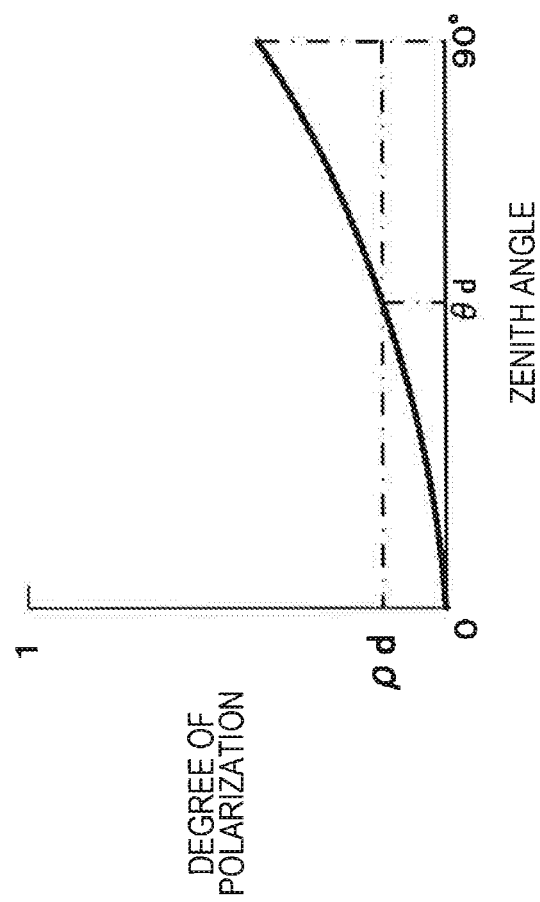
FIG. 16 is a diagram exemplifying relation between the degree of polarization and the zenith angle (in the case of diffusion reflection).

It is known that relation between the degree of polarization and the zenith angle (in the case of diffusion reflection) has, for example, a characteristic illustrated in FIG. 16 from the Fresnel's formulas. The zenith angle θd can be determined on the basis of the degree of polarization ρd from the characteristic illustrated in FIG. 16. Note that the characteristic illustrated in FIG. 16 is an example and the characteristic varies depending on a refractive index of an object.

The normal map generating unit 52 derives relation between the intensity and the polarization angle from a polarization direction and intensity of a polarized image on the basis of the polarized image having three or more polarization directions and thereby determines the azimuth angle φd with which the intensity becomes the largest. The normal map generating unit 52 further calculates the degree of polarization ρd using the maximum intensity and the minimum intensity obtained from the relation between the intensity and the polarization angle and determines the zenith angle φd corresponding to the calculated degree of polarization ρd on the basis of a characteristic curve representing relation between the degree of polarization and the zenith angle. In this manner, the normal map generating unit 52 generates a normal map by deriving normal information (azimuth angle φd and zenith angle φd) of an object for every pixel position on the basis of a polarized image having three or more polarization directions. The normal map generating unit 52 outputs the generated normal map to the map integrating unit 55.

Also, the first imaging unit and the second imaging unit are configured such that pixel values of four different polarization directions can be obtained in an area of a unit of 2*2 pixels without a color filter and thus a polarized image of achromatic colors is generated. Thus, a polarized image having a high spatial resolution and higher sensitivity as compared to a case where a color filter is provided can be obtained and a normal map with preferable accuracy can be output to the map integrating unit 55. Note that the normal map is generated using the polarized image generated by the first imaging unit 21 in FIG. 12; however, the normal map may be generated using the polarized image generated by the second imaging unit 21. In this case, the depth map generating unit 51 generates a depth map from a viewpoint of the second imaging unit 22 and outputs to the map integrating unit 55 as described above.

The map integrating unit 55 performs integration processing of the depth map generated by the depth map generating unit 51 and the normal map generated by the normal map generating unit 52 and generates a depth map having an accuracy higher than or equal to that of the depth map generated by the depth map generating unit 51. For example in a case where no depth value is acquired in a depth map, the map integrating unit 55 traces a surface shape of an object on the basis of a surface shape of the object represented in the normal map and a depth value represented in the depth map using a pixel a depth value of which is obtained as a starting point. The map integrating unit 55 calculates a depth value corresponding to a pixel a depth value of which is not obtained by tracing the surface shape. Moreover, the map integrating unit 55 generates a depth map having an accuracy higher than or equal to that of the depth map supplied from the depth map generating unit 51 by including the estimated depth value in the depth map supplied from the depth map generating unit 51. The map integrating unit 55 outputs the depth map after integration processing to the integrated map viewpoint converting unit 56.

FIG. 17 is a diagram for explaining integration processing of the maps. Note that integration processing on one line will be described for example for simplicity of descriptions. It is assumed that the object OB is imaged by the first imaging unit 21 and the second imaging unit 22 as illustrated in (a) of FIG. 17, that a depth map illustrated in (b) of FIG. 17 is obtained by the depth map generating unit 51, and that a normal map illustrated in (c) of FIG. 17 is obtained by the normal map generating unit 52. It is also assumed that, for example, in the depth map a depth value of a pixel at a left end is "2 (meters)" and that no depth value is stored in other pixels represented as "x". The map integrating unit 55 estimates a surface shape of the object OB on the basis of the normal map. Here, a second pixel from the left end can be determined, on the basis of a normal direction of the pixel, as being corresponding to an inclined surface approaching from an object surface corresponding to the pixel at the left end toward the first imaging unit 21 and the second imaging unit 22. Therefore, the map integrating unit 55 estimates a depth value of the second pixel from the left end by tracing the surface shape of the object OB using the pixel at the left end as a starting point and derives "1.5 (meters)" for example. The map integrating unit 55 further stores the estimated depth value in the depth map. Here, a third pixel from the left end can be determined, on the basis of a normal direction of the pixel, as being corresponding a surface facing the first imaging unit 21 and the second imaging unit 22. Therefore, the map integrating unit 55 estimates a depth value of the third pixel from the left end by tracing the surface shape of the object OB using the pixel at the left end as a starting point and derives "1 (meter)" for example. The map integrating unit 55 further stores the estimated depth value in the depth map. Here, a fourth pixel from the left end can be determined as being corresponding an inclined surface receding from an object surface corresponding to the third pixel from the left end away from the first imaging unit 21 and the second imaging unit 22. Therefore, the map integrating unit 55 estimates a depth value of the fourth pixel from the left end by tracing the surface shape of the object OB using the pixel at the left end as a starting point and derives "1.5 (meters)" for example. The map integrating unit 55 further stores the estimated depth value in the depth map. A depth value of the fifth pixel from the left end is estimated in a similar manner and for example "2 (meters)" is stored in the depth map.

In this manner, the map integrating unit 55 performs integration processing of the depth map and the normal map and estimates a depth value by tracing the surface shape on the basis of the normal map using a depth value retained in the depth map as a starting point. Therefore, the map integrating unit 55 can complement a missing depth value even when a part of depth values is missing in the depth map illustrated in (b) of FIG. 17 generated by the depth map generating unit 51. As a result of this, the depth map illustrated in (d) of FIG. 17 having a higher accuracy than that of the depth map illustrated in (b) of FIG. 17 can be generated.

The integrated map viewpoint converting unit 56 performs viewpoint conversion of the depth map after integration supplied from the map integrating unit 55. The depth map supplied from the map integrating unit 55 represents a depth value corresponding to each pixel of an image generated by the first imaging unit 21 (or the second imaging unit 22) but does not correspond to an image generated by the third imaging unit 23. Therefore, the integrated map viewpoint converting unit 56 performs viewpoint conversion to covert the depth map after integration supplied from the map integrating unit 55 into a depth map from a viewpoint of the third imaging unit 23.

Figure 18:
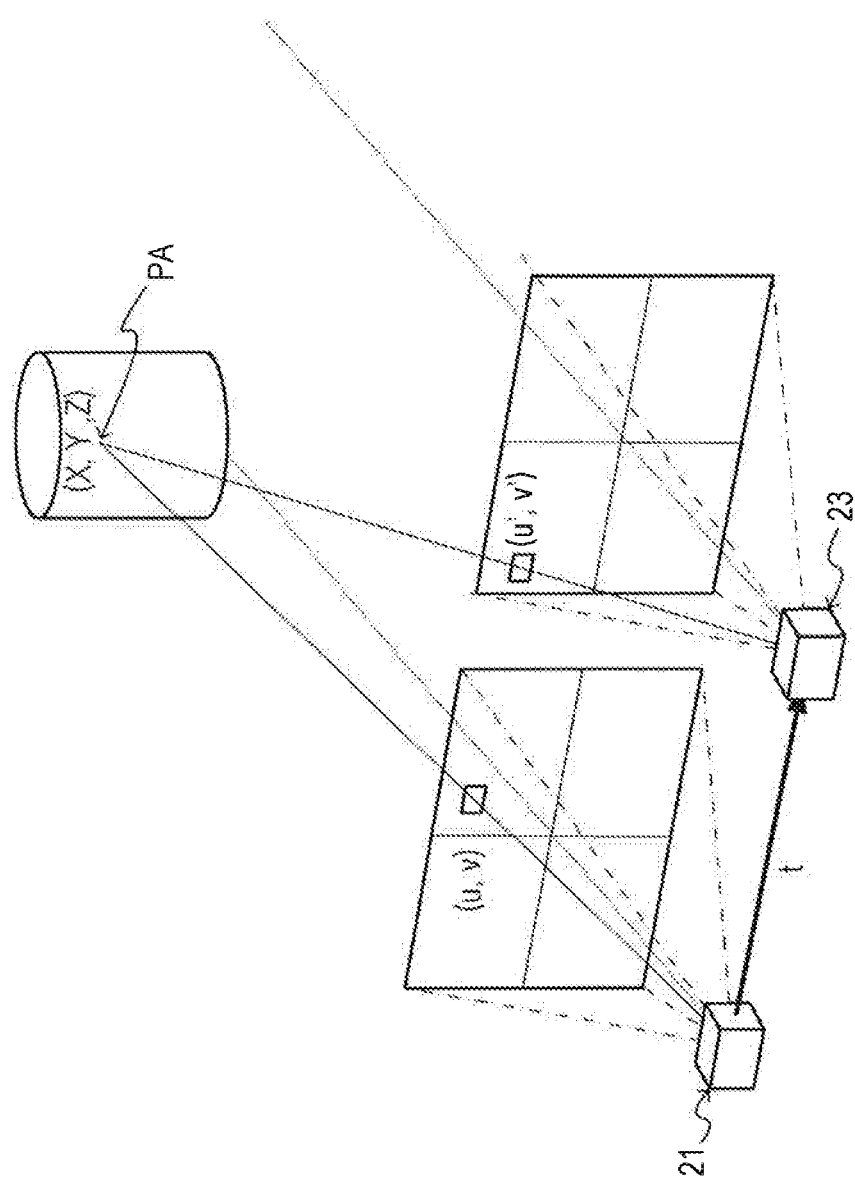
FIG. 18 is a diagram for explaining viewpoint conversion.

FIG. 18 is a diagram for explaining viewpoint conversion. For example, a depth corresponding to a pixel (u, v) of an image generated by the first imaging unit 21 is denoted as "d". Also, a focal distance of the first imaging unit 21 is denoted as "f".

Regarding the center of the first imaging unit 21 as the origin in a world coordinate system W, a position (X, Y, Z) of a point PA in the world coordinate system W to which the pixel (u, v) corresponds can be calculated from mathematical formulas (4) to (6).

$$X = u*d/f \quad (4)$$

$$Y = v*d/f \quad (5)$$

$$Z = d \quad (6)$$

Here, rotation of the third imaging unit 23 with respect to the first imaging unit 21 is defined as a rotation matrix RM and translation of the third imaging unit 23 with respect to the first imaging unit 21 is defined as a translation vector t. Also, a focal distance of the third imaging unit 23 is denoted as "f". In this case, a pixel (u', v') on an image plane of the third imaging unit 23 where the point PA is projected on can be calculated from mathematical formulas (8) and (9) using (X', Y', Z') obtained on the basis of mathematical formula (7). Therefore, the pixel (u', v') provides a depth "d" corresponding to the pixel (u, v).

[Mathematical Formula 4]

$$\begin{bmatrix} X' \\ Y' \\ Z' \end{bmatrix} = RM^{-1} \begin{bmatrix} X \\ Y \\ Z \end{bmatrix} - t \quad (7)$$

$$u' = X' * f'/Z' \quad (8)$$

$$v' = Y' * f'/Z' \quad (9)$$

By executing the above calculations for all the pixels, the depth map from a viewpoint of the first imaging unit 21 can be converted into a depth map from a viewpoint of the third imaging unit 23.

Note that the first imaging unit 21 and the third imaging unit 23 are installed to have a predetermined rotation amount and a translation amount. Alternatively, a rotation amount and a translation amount may be acquired after installment of the first imaging unit 21 and the third imaging unit 23 using a method disclosed in, for example, Zhengyou Zhang, "A Flexible New Technique for Camera Calibration," IEEE Trans. Pattern Anal. Mach. Intell. (PAMI), 22(11): 1330-1334, 2000 and other literatures.

Furthermore, the image processing unit 50 may associate the generated depth map with a third image (for example as attribute information or other information of the third image) and store in a storage medium or output to an external device or other devices together with the third image.

Figure 19:
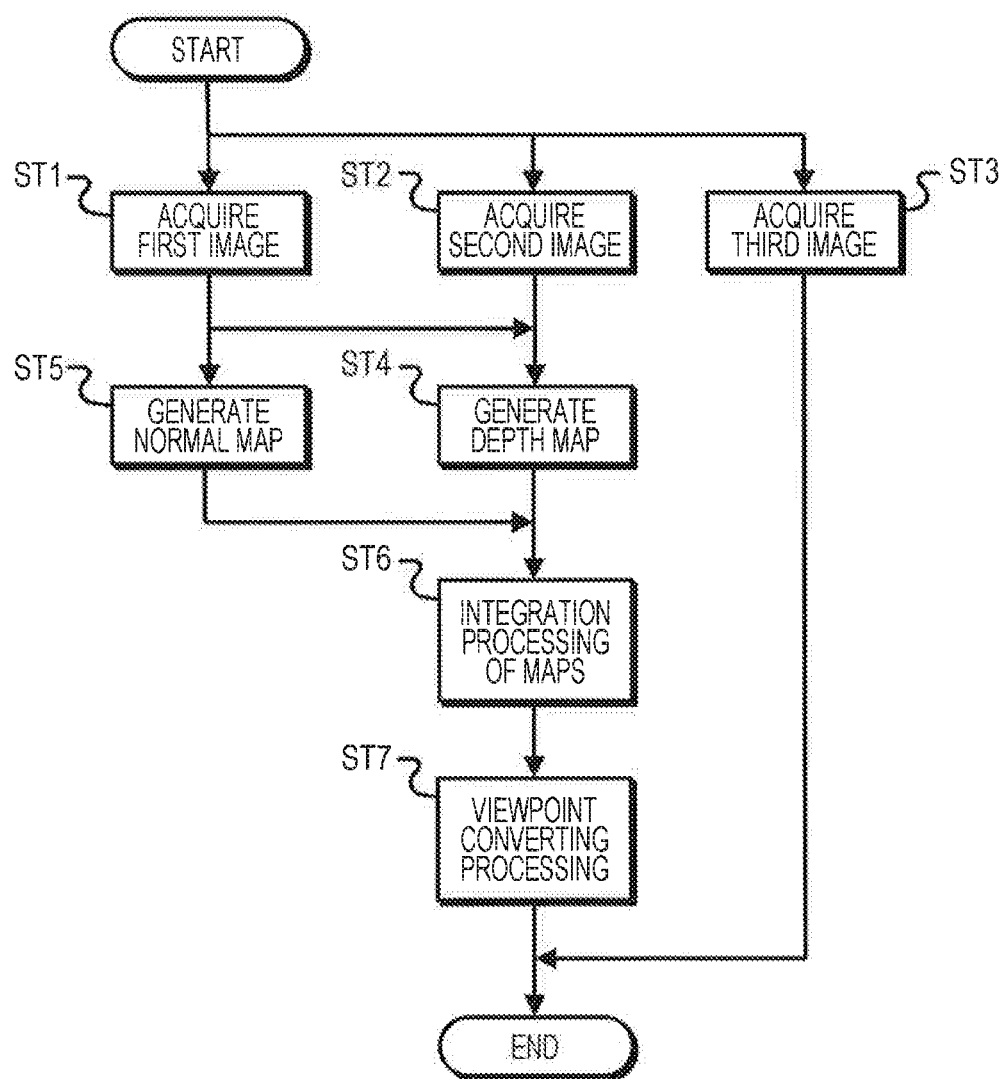
FIG. 19 is a flowchart illustrating processing operation of the first embodiment.

FIG. 19 is a flowchart illustrating processing operation of the first embodiment. The image processing unit 50 acquires a first image in step ST1. The image processing unit 50 acquires, as the first image, a polarized image having a plurality of polarization directions generated by the first imaging unit 21. The image processing unit 50 further acquires a second image in step ST2. The image processing unit 50 acquires, as the second image, the polarized image having a plurality of polarization directions generated by the second imaging unit 22. The image processing unit 50 acquires a third image in step ST3. The image processing unit 50 acquires, as the third image, a non-polarized image generated by the third imaging unit 23.

Figure 20:
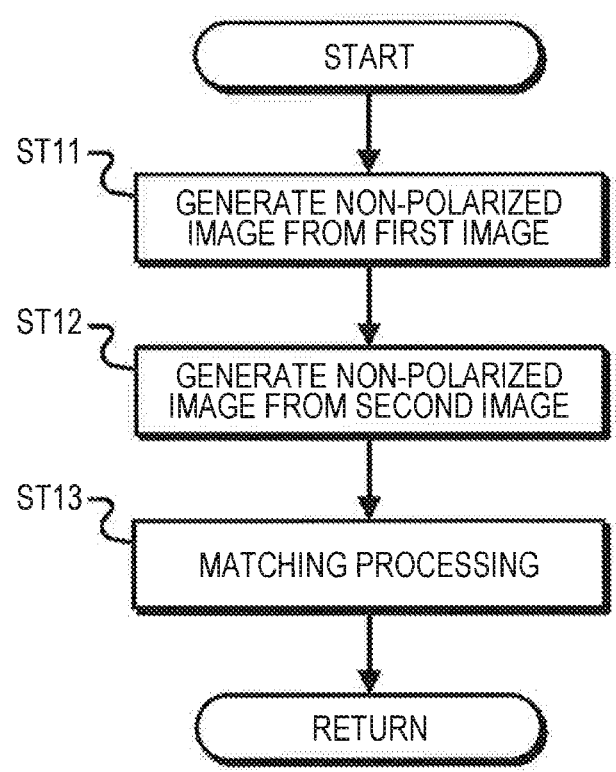
FIG. 20 is a flowchart illustrating operation of generating a depth map.

The image processing unit 50 generates a depth map in step ST4. FIG. 20 is a flowchart illustrating operation of generating a depth map. The depth map generating unit 51 of the image processing unit 50 generates a non-polarized image from the first image in step ST11. The depth map generating unit 51 performs, for example, averaging filter processing or other processing on the first image in order to eliminate a difference of intensity level between the first image and the second image and generates a non-polarized image. Then the flow proceeds to step ST12.

The depth map generating unit 51 of the image processing unit 50 generates a non-polarized image from the second image in step ST12. The depth map generating unit 51 performs, for example, averaging filter processing or other processing on the second image in order to eliminate a difference of intensity level between the first image and the second image as described above and generates a non-polarized image. Then the flow proceeds to step ST13.

The depth map generating unit 51 of the image processing unit 50 performs matching processing in step ST13. The depth map generating unit 51 performs matching processing using the non-polarized images generated in steps ST11 and ST12. Moreover, in the matching processing a difference in intensity level does not influence even when an image obtained by performing edge extraction processing on a non-polarized image. The depth map generating unit 51 generates a depth map representing a depth value of each pixel of the first image on the basis of a result of the matching processing and then the flow proceeds to step ST5 in FIG. 19.

The image processing unit 50 generates a normal map in step ST5. The normal map generating unit 52 of the image processing unit 50 determines the azimuth angle φd and the zenith angle φd for each pixel using the first image and generates a normal map. The flow then proceeds to step ST6.

The image processing unit 50 performs integration processing of the maps in step ST6. The map integrating unit 55 of the image processing unit 50 estimates a depth value corresponding to a pixel a depth value of which is not obtained by tracing a surface shape using a pixel a depth value of which is obtained as a starting point on the basis of a depth value represented in the depth map and a surface shape of the object represented in the normal map. Moreover, the map integrating unit 55 generates a depth map having an accuracy higher than or equal to that of the depth map generated in step ST4 by including the estimated depth value in the depth map. The flow then proceeds to step ST7.

The image processing unit 50 performs viewpoint converting processing in step ST7. The integrated map viewpoint converting unit 56 of the image processing unit 50 converts the depth map with a high accuracy from a viewpoint of the first image generated in step ST6 into a depth map from a viewpoint of the third image.

According to the first embodiment as described above, even for an object area a depth value of which is difficult to acquire in matching processing, a depth value can be estimated using a normal map generated on the basis of a polarized image having a plurality of polarization directions. Therefore, a depth map having an accuracy higher than or equal to that of a depth map generated by the depth map generating unit 25, that is, a depth map storing a depth value for each pixel of an object area can be generated.

Viewpoint conversion is further performed and for example the depth map with a high accuracy from a viewpoint of the first image is converted into the depth map from a viewpoint of the third image. As a result of this, a third image free from deterioration of an image quality and intensity due to providing a polarizer as well as a depth map with a high accuracy corresponding to the third image can be generated.

3-2. Configuration and Operation of Second Embodiment

Next, a case where a solid state imaging element having a larger number of pixels than that of the first imaging unit or the second imaging unit is used as a third imaging unit in order to enable generation of a captured image of a high resolution will be described.

Figure 21:
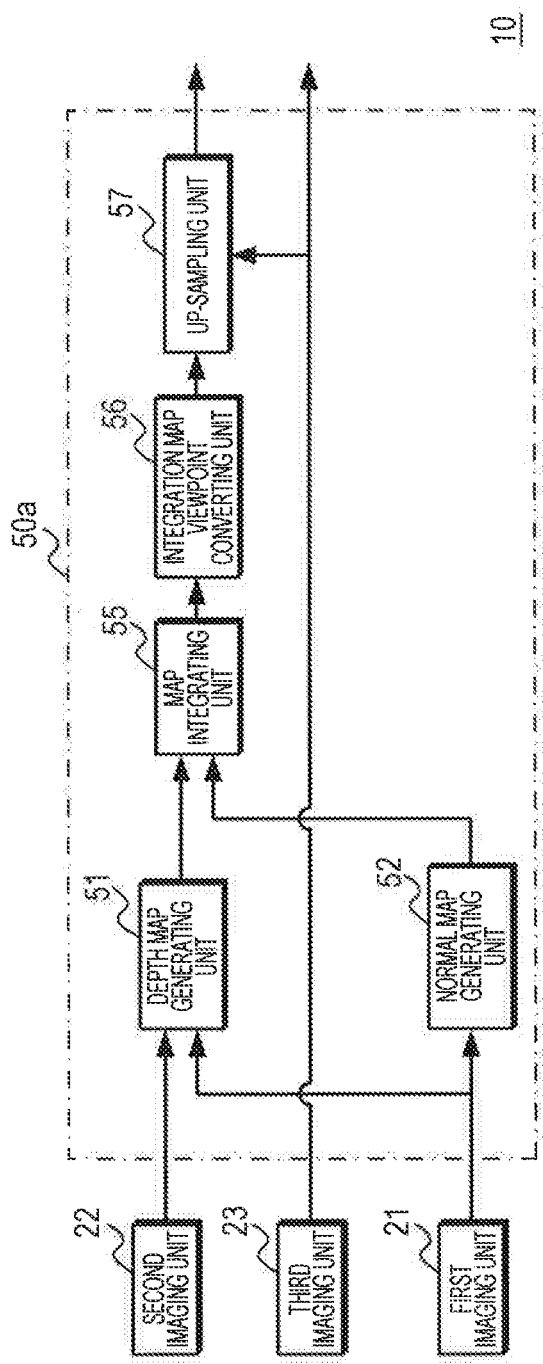
FIG. 21 is a diagram illustrating a configuration of a second embodiment of an image processing unit.

FIG. 21 is a diagram illustrating a configuration of the second embodiment of the image processing unit. An image processing unit 50 of an imaging device 10 includes a depth map generating unit 51, a normal map generating unit 52, a map integrating unit 55, an integrated map viewpoint converting unit 56, and an up-sampling unit 57. The depth map generating unit 51, the normal map generating unit 52, the map integrating unit 55, and the integrated map viewpoint converting unit 56 perform processing similar to that of the first embodiment described above.

The depth map generating unit 51 performs stereo matching processing on the basis of the polarized image generated by the first imaging unit 21 and the polarized image generated by the second imaging unit 22 having a different viewpoint position from that of the first imaging unit 21 and thereby generates a depth map storing a depth value for each pixel. The depth map generating unit 51 outputs the generated depth map to the map integrating unit 55.

The normal map generating unit 52 generates a normal map from polarized images of a plurality of directions having different polarization directions. For example, a normal map is generated from the polarized image generated by the first imaging unit 21 and output to the map integrating unit 55.

The map integrating unit 55 performs integration processing of the depth map generated by the depth map generating unit 51 and the normal map generated by the normal map generating unit 52 and generates a depth map having an accuracy higher than or equal to that of the depth map generated by the depth map generating unit 51. The map integrating unit 55 outputs the depth map after integration to the integrated map viewpoint converting unit 56.

The integrated map viewpoint converting unit 56 performs viewpoint conversion on the depth map supplied from the map integrating unit 55 and converts, for example a depth map from a viewpoint of the first imaging unit 21 supplied from the map integrating unit 55 into a depth map from a viewpoint of the third imaging unit 23. The integrated map viewpoint converting unit 56 outputs the depth map after viewpoint conversion to the up-sampling unit 57.

The up-sampling unit 57 performs up-sampling processing on the depth map supplied from the integrated map viewpoint converting unit 56 and generates a depth map having a resolution corresponding to a captured image having a large number of pixels generated by the third imaging unit 23. The up-sampling unit 57 up-samples the depth map having a smaller number of pixels than that of the third image using a third image having a larger number of pixels as a guide using a method disclosed in "Johannes Kopf and Michael F. Cohen and Dani Lischinski and Matt Uyttendaele, "Joint Bilateral Upsampling," ACM Transactions on Graphics (Proceedings of SIGGRAPH 2007)", for example, and generates a depth map representing a depth value for each pixel of the third image. Alternatively, the up-sampling unit 57 may use another method such as a method of up-sampling using a bilinear filter and thereby generate a depth map having the number of pixels corresponding to the third image.

Note that the image processing unit 50 may associate the generated depth map with a third image (for example as attribute information or other information of the third image) having a larger number of pixels than that of the first image or the second image and store in a storage medium or output to an external device or other devices together with the third image.

Figure 22:
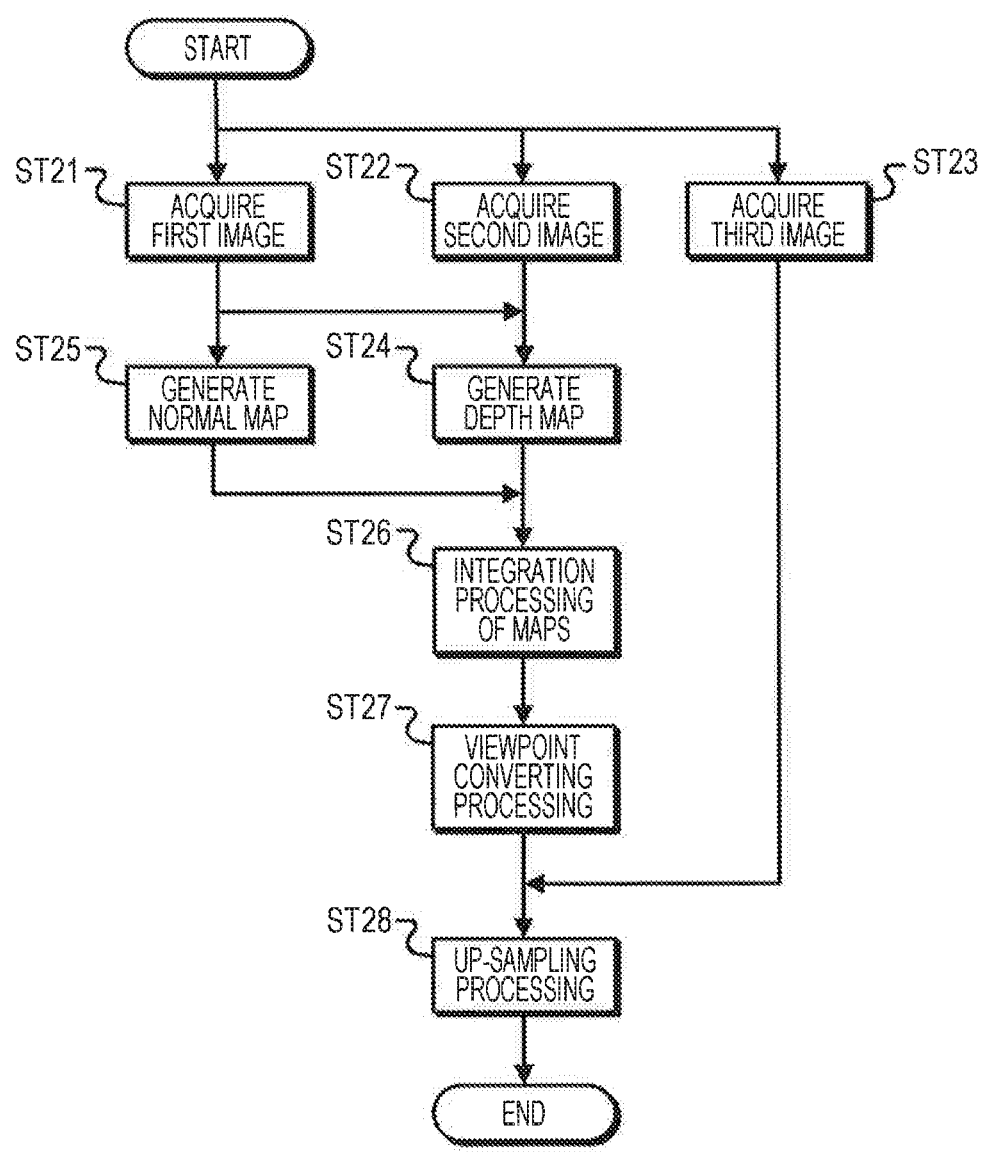
FIG. 22 is a flowchart illustrating operation of the second embodiment.

FIG. 22 is a flowchart illustrating operation of the second embodiment. The image processing unit 50 acquires a first image in step ST21. The image processing unit 50 acquires, as the first image, a polarized image having a plurality of polarization directions generated by the first imaging unit 21. The image processing unit 50 further acquires a second image in step ST22. The image processing unit 50 acquires, as the second image, the polarized image having a plurality of polarization directions generated by the second imaging unit 22. The image processing unit 50 acquires a third image in step ST23. The image processing unit 50 acquires, as the third image, a non-polarized image generated by the third imaging unit 23.

The image processing unit 50 generates a depth map in step ST24. The depth map generating unit 51 of the image processing unit 50 generates a depth map corresponding to the first image from the first image and the second image similarly to step ST4 in FIG. 19. The flow then proceeds to step ST25.

The image processing unit 50 generates a normal map in step ST25. The normal map generating unit 52 of the image processing unit 50 determines the azimuth angle φd and the zenith angle φd for each pixel using the first image and generates a normal map similarly to step ST5 in FIG. 19. The flow then proceeds to step ST26.

The image processing unit 50 performs integration processing of the maps in step ST26. The map integrating unit 55 of the image processing unit 50 generates a depth map having an accuracy higher than that of the depth map generated in step ST24 similarly to step ST6 in FIG. 19. The flow then proceeds to step ST27.

The image processing unit 50 performs viewpoint converting processing in step ST27. The integrated map viewpoint converting unit 56 of the image processing unit 50 converts the depth map with a high accuracy from a viewpoint of the first image generated in step ST26 into a depth map from a viewpoint of the third image similarly to step ST7 in FIG. 19. The flow then proceeds to step ST28.

The image processing unit 50 performs up-sampling processing in step ST28. The up-sampling unit 57 of the image processing unit 50 performs up-sampling processing on the depth map supplied from the integrated map viewpoint converting unit 56 and generates a depth map corresponding to a captured image generated by the third imaging unit.

According to the second embodiment as described above, even for an object area a depth value of which is difficult to acquire in matching processing, a depth value can be estimated using a normal map generated on the basis of a polarized image having a plurality of polarization directions. Therefore, a depth map having an accuracy higher than or equal to that of a depth map generated by the depth map generating unit 51, that is, a depth map storing a depth value for each pixel of an object area can be generated similarly to the first embodiment. Viewpoint conversion is further performed and for example the depth map with a high accuracy from a viewpoint of the first image is converted into the depth map from a viewpoint of the third image and thus a depth map with a high accuracy corresponding to the third image can be generated.

In the second embodiment, up-sampling processing is further performed on the depth map after viewpoint conversion and a depth map representing a depth value for each pixel of the third image having a large number of pixels is generated. As a result of this, a third image having a large number of pixels and free from deterioration of an image quality and intensity due to providing a polarizer as well as a depth map with a high accuracy having the number of pixels corresponding to the third image can be generated.

Meanwhile, when a pixel size is reduced due to a larger number of pixels, acquiring a polarized image of a preferable image quality becomes difficult and a polarizer cannot be configured easily at a low cost. In the second embodiment, however, a depth map with a high accuracy having the number of pixels corresponding to the third image can be generated without using a solid state imaging element of a large number of pixels such as the third imaging unit in the first imaging unit and the second imaging unit. Therefore, an imaging device can be provided at a reasonable price.

3-3. Configuration and Operation of Third Embodiment

In the first and the second embodiments described above, viewpoint conversion is performed on the depth map after integration of the maps; however, the viewpoint conversion can also be performed before integration of the maps. Next, a case where viewpoint conversion is performed before integration of maps will be described as a third embodiment.

Figure 23:
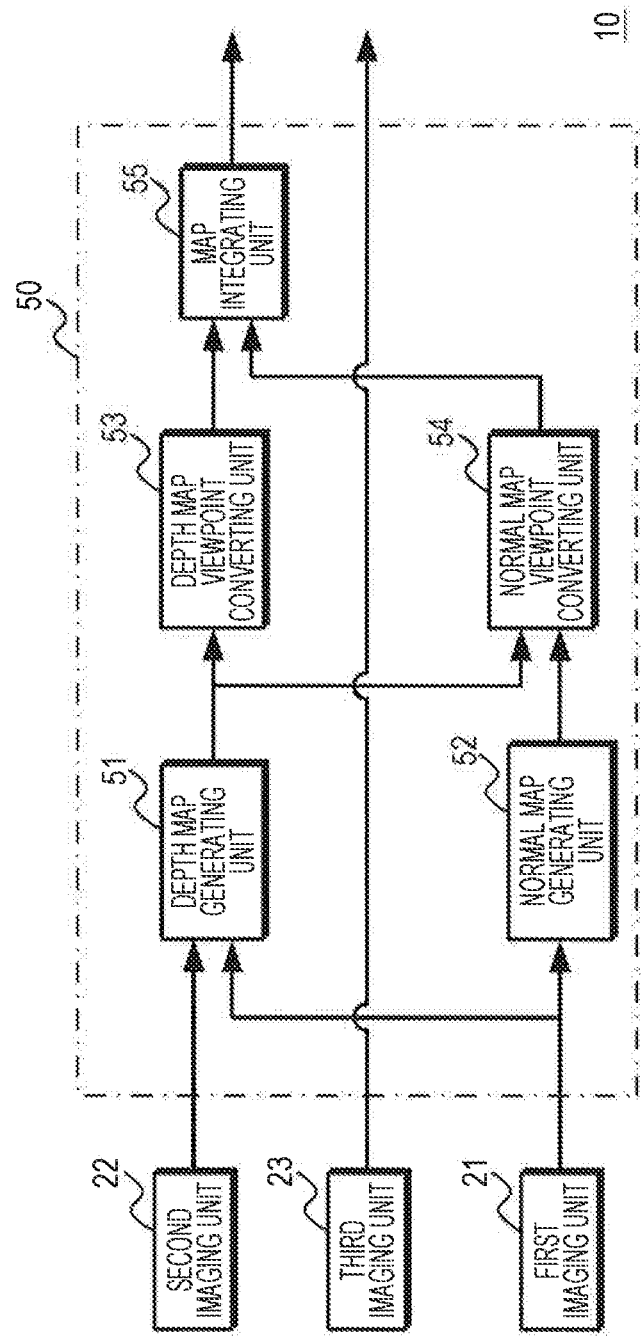
FIG. 23 is a diagram illustrating a configuration of a third embodiment of an image processing unit.

FIG. 23 is a diagram illustrating a configuration of the third embodiment of the image processing unit. An image processing unit 50 of an imaging device 10 includes a depth map generating unit 51, a normal map generating unit 52, a depth map viewpoint converting unit 53, a normal map viewpoint converting unit 54, and a map integrating unit 55. The depth map generating unit 51, the normal map generating unit 52, and the map integrating unit 55 perform processing similar to that of the first embodiment described above.

The depth map generating unit 51 performs stereo matching processing on the basis of the polarized image generated by the first imaging unit 21 and the polarized image generated by the second imaging unit 22 having a different viewpoint position from that of the first imaging unit 21. The depth map generating unit 51 generates a depth map storing a depth value for each pixel of a viewpoint of the first imaging unit 21 by performing stereo matching processing and outputs to the depth map viewpoint converting unit 53 and the normal map viewpoint converting unit 54.

The normal map generating unit 52 generates a normal map from polarized images of a plurality of directions having different polarization directions. For example, a normal map is generated from the polarized image generated by the first imaging unit 21 and output to the depth map viewpoint converting unit 53 and the normal map viewpoint converting unit 54.

The depth map viewpoint converting unit 53 performs similar processing to that of the integrated map viewpoint converting unit 56 described above and converts a depth map from a viewpoint of the first imaging unit 21 supplied from the depth map generating unit 51 into a depth map from a viewpoint of the third imaging unit 23. The integrated map viewpoint converting unit 56 outputs the depth map after viewpoint conversion to the map integrating unit 55.

The normal map viewpoint converting unit 54 converts, for example, a normal map from a viewpoint of the first imaging unit 21 supplied from the normal map generating unit 52 into a normal map from a viewpoint of the third imaging unit 23.

Figure 24:
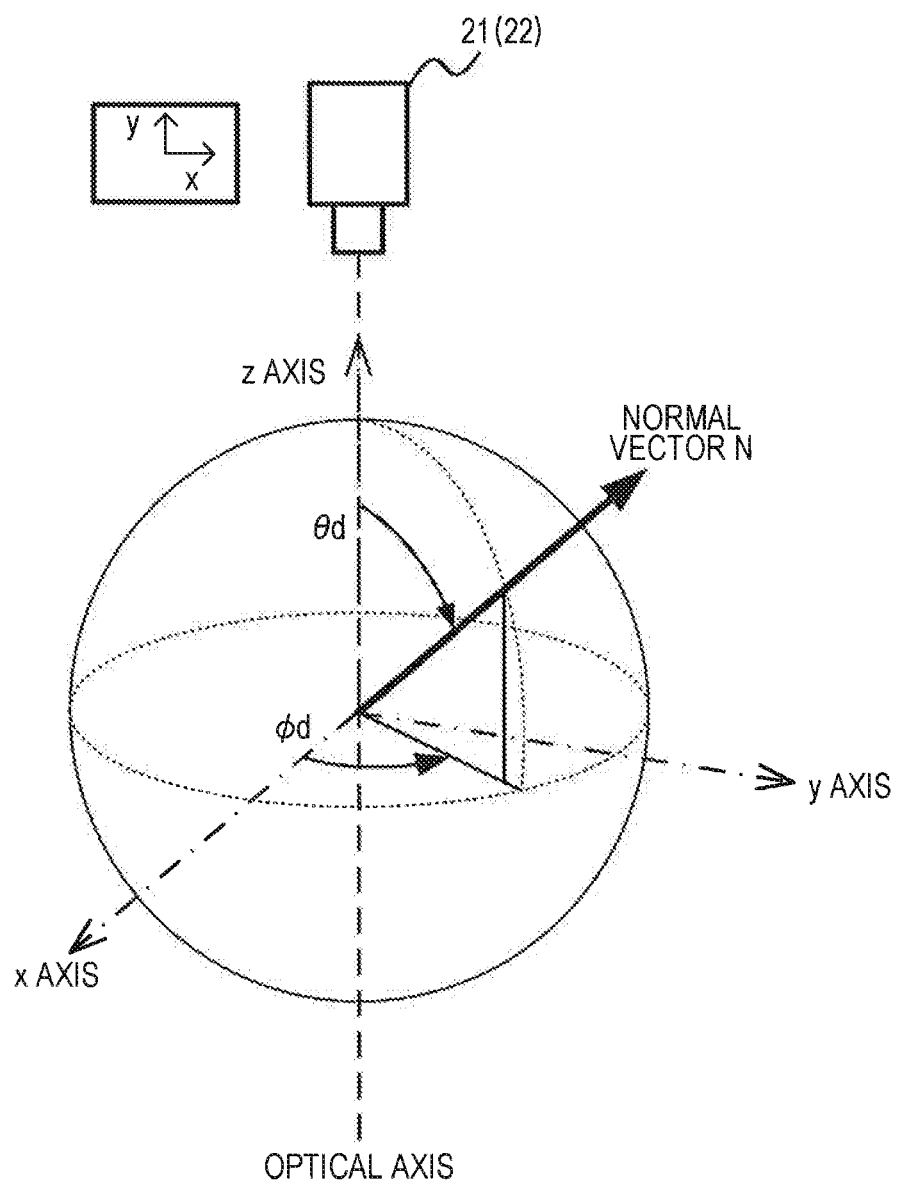
FIG. 24 is a diagram illustrating relation between an imaging unit and a coordinate system of a normal vector.

FIG. 24 is a diagram illustrating relation between an imaging unit and a coordinate system of a normal vector. Here, when an optical axis direction of the imaging unit 21 is regarded as a z axis direction, a lateral direction (for example horizontal direction) is regarded to as an x axis direction, and a normal vector N representing a normal direction is expressed as in mathematical formula (10), components of the azimuth angle $\phi d$, the zenith angle $\phi d$, and the normal vector have relation expressed by mathematical formulas (11) and (12).

[Mathematical Formula 5]

$$N = [N_x, N_y, N_z]^T \qquad (10)$$

$$\theta d = \arccos N_z \qquad (11)$$

$$\phi d = \arctan \frac{N_y}{N_x} \qquad (12)$$

Therefore, the normal map viewpoint converting unit 54 performs viewpoint conversion of a normal vector on the basis of mathematical formula (13). Here, a rotation matrix RM is equivalent to mathematical formula (7).

[Mathematical Formula 6]

$$\begin{bmatrix} N'_x \\ N'_y \\ N'_z \end{bmatrix} = RM^{-1} \begin{bmatrix} N_x \\ N_y \\ N_z \end{bmatrix} \qquad (13)$$

The normal map viewpoint converting unit 54 further calculates which pixel position in the normal map from a viewpoint of the third imaging unit 23 a pixel, subjected to viewpoint conversion of the normal vector in the normal map from a viewpoint of the first imaging unit 21 corresponds to. For example denoting a pixel (u, v), when the center of the first imaging unit 21 is regarded as the origin in a world coordinate system W, corresponding to a point PA in the world coordinate system as a position (X, Y, Z), the normal map viewpoint converting unit 54 calculates a position of a pixel (u', v') on a normal map of the third imaging unit 23 where the point PA in the position (X, Y, Z) is projected, using the rotation matrix and a depth value of the pixel (u, v).

The normal map viewpoint converting unit 54 executes, on each pixel of the normal map from a viewpoint of the first imaging unit 21, viewpoint conversion of such a normal vector and calculation of a corresponding pixel position on the normal map of the third imaging unit 23. The normal map from a viewpoints of the first imaging unit 21 is therefore converted into a normal map from a viewpoint of the third imaging unit 23 by the normal map viewpoint converting unit 54. Note that a depth value of the pixel (u, v) is acquired from the depth map generated by the depth map generating unit 51.

The normal map viewpoint converting unit 54 generates a normal map representing the azimuth angle and the zenith angle after viewpoint conversion from the normal vector after viewpoint conversion and outputs to the map integrating unit 55.

The map integrating unit 55 performs integration processing of the depth map converted into that from a viewpoint of the third imaging unit 23 by the depth map viewpoint converting unit 53 and the normal map converted into that from a viewpoint of the third imaging unit 23 by the normal map viewpoint converting unit 54. The map integrating unit 55 generates a depth map having an accuracy higher than or equal to that of the depth map from a viewpoint of the third imaging unit 23 generated by the depth map viewpoint converting unit 53 by performing integration processing of the maps.

Figure 25:
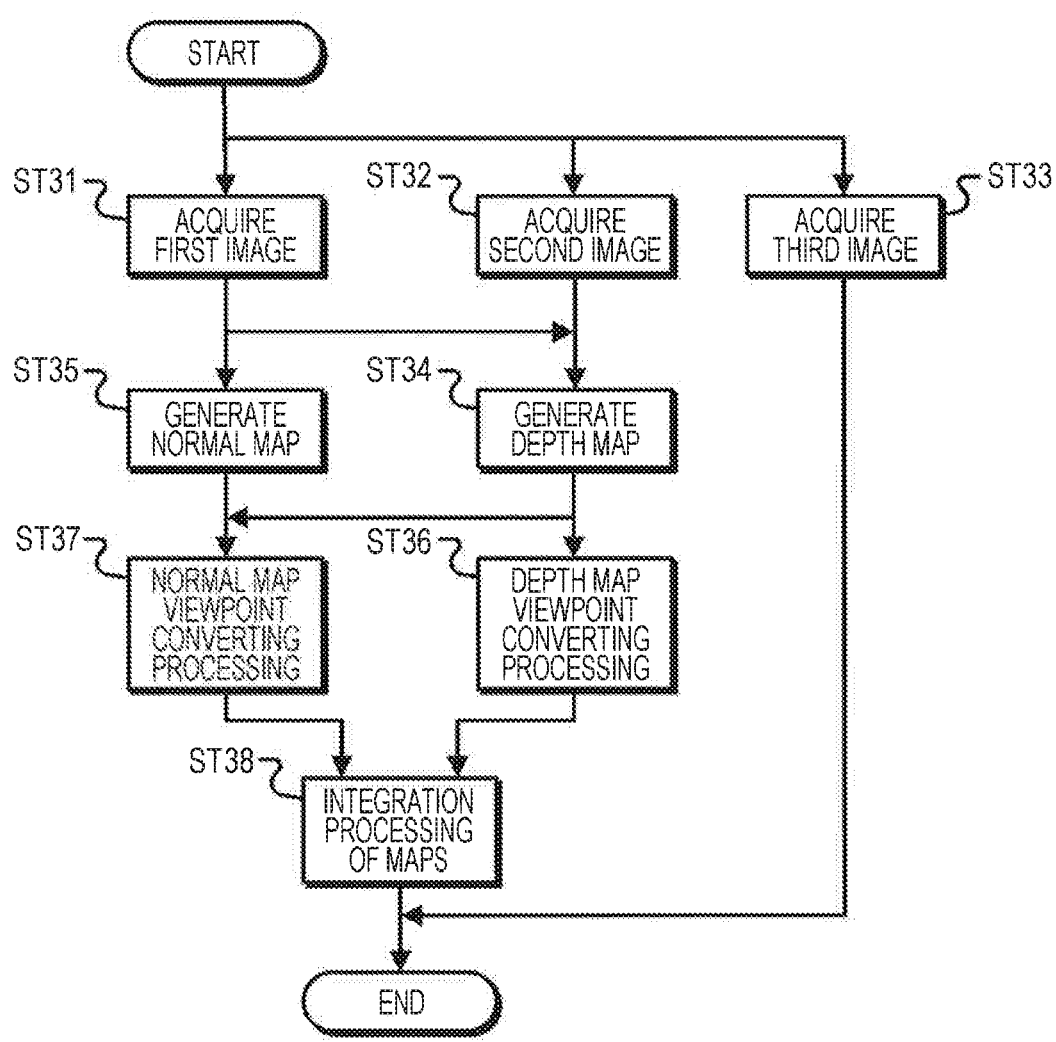
FIG. 25 is a flowchart illustrating operation of the third embodiment.

FIG. 25 is a flowchart illustrating operation of the third embodiment. The image processing unit 50 acquires a first image in step ST31. The image processing unit 50 acquires, as the first image, a polarized image having a plurality of polarization directions generated by the first imaging unit 21. The image processing unit 50 further acquires a second image in step ST32. The image processing unit 50 acquires, as the second image, the polarized image having a plurality of polarization directions generated by the second imaging unit 22. The image processing unit 50 acquires a third image in step ST33. The image processing unit 50 acquires, as the third image, a non-polarized image generated by the third imaging unit 23.

The image processing unit 50 generates a depth map in step ST34. The depth map generating unit 51 of the image processing unit 50 generates a depth map corresponding to the first image from the first image and the second image similarly to step ST4 in FIG. 19. The flow then proceeds to step ST36.

The image processing unit 50 generates a normal map in step ST35. The normal map generating unit 52 of the image processing unit 50 determines the azimuth angle φd and the zenith angle φd for each pixel using the first image and generates a normal map similarly to step ST5 in FIG. 19. The flow then proceeds to step ST37.

The image processing unit 50 performs depth map viewpoint converting processing in step ST36. The depth map viewpoint converting unit 53 of the image processing unit 50 converts the depth map from a viewpoint of the first image generated in step ST34 into a depth map from a viewpoint of the third image similarly to step ST7 in FIG. 19. The flow then proceeds to step ST38.

The image processing unit 50 performs normal map viewpoint converting processing in step ST37. The normal map viewpoint converting unit 54 of the image processing unit 50 converts the normal map generated in step ST35 into a normal map from a viewpoint of the third image from that from a viewpoint of the first image on the basis of a depth value represented in the depth map. The flow then proceeds to step ST38.

The image processing unit 50 performs integration processing of the maps in step ST38. The map integrating unit 55 of the image processing unit 50 generates a depth map having an accuracy higher than that of the depth map generated in step ST36 using the normal map generated in step ST37 similarly to step ST6 in FIG. 19.

According to the third embodiment as described above, even for an object area a depth value of which is difficult to acquire in matching processing, a depth value can be estimated using a normal map generated on the basis of a polarized image having a plurality of polarization directions. Therefore, a depth map having an accuracy higher than or equal to that of a depth map generated by the depth map generating unit 51, that is, a depth map storing a depth value for each pixel of an object area can be generated similarly to the first embodiment. Viewpoint conversion is further performed and for example the depth map and the normal map from a viewpoint of the first image are converted into the depth map and the normal map from a viewpoint of the third image and then are integrated. Therefore, a depth map with a high accuracy from a viewpoint of the third image can be generated.

4. Other Embodiments of Imaging Unit and Image Processing Unit

Meanwhile in the embodiment described above, the case where a polarized image of achromatic colors is generated using the polarizer illustrated in FIG. 10 has been described; however, generating a polarized image in colors by the first imaging unit and the second imaging unit allows a normal map to be generated considering a reflection component of an object.

Figure 26:
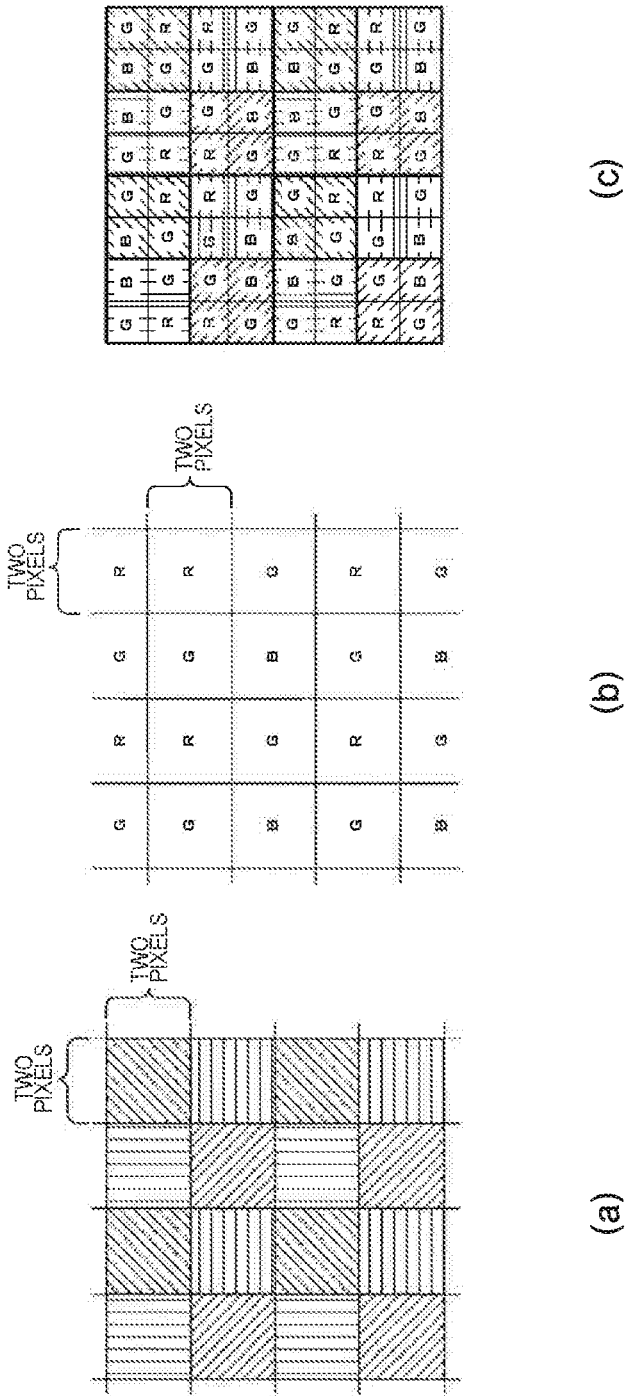
FIG. 26 is a diagram exemplifying another configuration of the first imaging unit and the second imaging unit.

FIG. 26 is a diagram exemplifying another configuration of the first imaging unit and the second imaging unit. Note that the first and the second imaging units have an equivalent configuration. In the imaging unit 21 (22), a plurality of pixels having the same polarization direction is regarded as a same polarization pixel block and pixels of respective colors are included in the same polarization pixel block. The imaging unit 21 (22) generates a polarized image. For example as in (a) of FIG. 26, a unit of 2*2 pixels having the same polarization direction as a same polarization pixel block in the imaging unit 21 (22). Furthermore, the imaging unit 21 (22) uses a polarizer in which a polarization pattern unit block of 4*4 pixels formed by four same polarization pixel blocks having different polarization directions is included in a repeated manner in a column direction and a row direction. Note that a polarization direction is represented by a direction of hatching lines in (a) of FIG. 26.

In a color filter of the imaging unit 21 (22), an array of colors is a Bayer array in a size of 2*2 pixels of a red color pixel R, green color pixels G, and a blue color pixel B for example as illustrated in (b) of FIG. 26. Meanwhile, a pixel block of 4*4 pixels formed by a red color pixel, a green color pixel, and a blue color pixel is regarded as a color pattern unit pixel block. In the imaging unit 21, the color pattern unit block has a positional difference of one pixel with respect to the polarization pattern unit block in each of the column direction and the row direction as illustrated in (c) of FIG. 26. Therefore, one same polarization pixel block includes one red color pixel R, one blue color pixel b, and two green color pixel G. Also, a pixel block of 2*2 pixels having the same color includes pixels of the four polarization directions.

Figure 27:
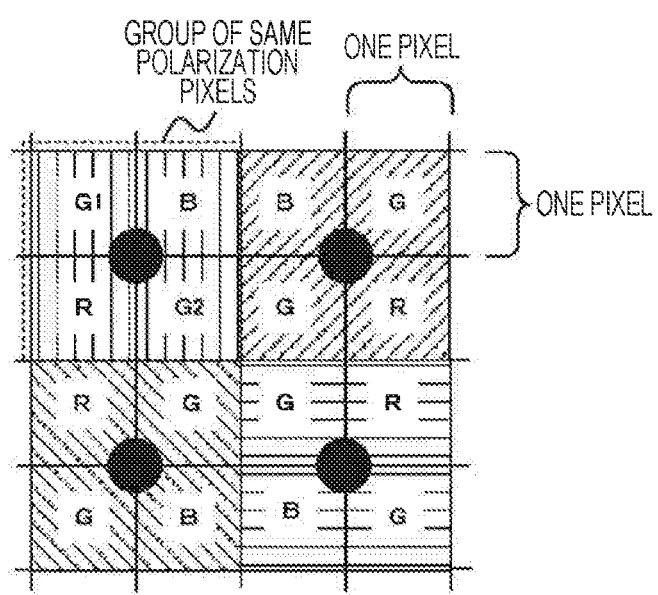
FIG. 27 is a diagram for explaining calculation of chrominance.

The normal map generating unit 52 removes a mirror surface reflection component from a polarized image in order to mitigate influence of mirror surface reflection, for example. Mirror surface reflection occurs caused by a dominant light source in an imaging scene. Also, when the imaging unit 21 (22) performs adjustment of white balance, gain is adjusted in accordance with a color of illumination in the adjustment of white balance, and thus a color of illumination that generates mirror surface reflection is considered to be achromatic. In this case, RGB values representing the color of illumination are the same values and thus deriving a chrominance allows a mirror surface reflection component to be removed. The normal map generating unit 52 derives a chrominance I'vpol for each same polarization pixel block, that is, for each position of a dot mark as illustrated in FIG. 27 on the basis of mathematical formula (14) from a polarized image performed with white balance correction. The normal map generating unit 52 performs such processing on every same polarization pixel block using a pixel value Rvpol of a red color pixel, a pixel value Gvpol of a green color image, and a pixel value Bvpol of a blue color pixel and generates a polarized image including only diffusion reflection components which is an image removed of mirror surface reflection components. Note that, in a case where a color array is configured by a Bayer array as illustrated in (b) of FIG. 27, a pixel value Gvpol of a green color pixel is obtained as an average value of pixel values Gv1 and Gv2 of two green color pixels, for example.

[Mathematical Formula 7]

$$I'_{upol} = \sqrt{(R_{upol} - G_{upol})^2 + (G_{upol} - B_{upol})^2 + (B_{upol} - R_{upol})^2} \quad (14)$$

Moreover, the normal map generating unit 52 generates a polarized image removed of mirror surface reflection components attributable to a light source for example under assumption that a light source is white. For removing a mirror surface reflection component, a method disclosed in a literature "D. Miyazaki, R. Tan, K. Hara, and K. Ikeuchi. Polarization-based inverse rendering from a single view. Proceedings of International Conference on Computer Vision, pages 982-987, 2003" may be used. That is, a color space is converted from an RGB space to an M space on the basis of mathematical formula (15) and an image removed of mirror surface reflection components is generated on the basis of mathematical formula (16). By returning the image removed of mirror surface reflection components from the M space to the RGB space on the basis of mathematical formula (17), a polarized image removed of mirror surface reflection components can be generated.

[Mathematical Formula 8]

$$\begin{pmatrix} m_1 \\ m_2 \\ m_3 \end{pmatrix} = \begin{pmatrix} 1 & -\frac{1}{2} & -\frac{1}{2} \\ 0 & \frac{\sqrt{3}}{2} & -\frac{\sqrt{3}}{2} \\ \frac{1}{3} & \frac{1}{3} & \frac{1}{3} \end{pmatrix} \begin{pmatrix} r \\ g \\ b \end{pmatrix} \quad (15)$$

$$\begin{pmatrix} \hat{m}_1 \\ \hat{m}_2 \\ \hat{m}_3 \end{pmatrix} = \begin{pmatrix} m_1 \\ m_2 \\ a\sqrt{m_1^2 + m_2^2} \end{pmatrix} \quad (16)$$

$$\begin{pmatrix} \hat{r} \\ \hat{g} \\ \hat{b} \end{pmatrix} = \begin{pmatrix} \frac{2}{3} & 0 & 1 \\ -\frac{1}{3} & \frac{1}{\sqrt{3}} & 1 \\ -\frac{1}{3} & -\frac{1}{\sqrt{3}} & 1 \end{pmatrix} \begin{pmatrix} \hat{m}_1 \\ \hat{m}_2 \\ \hat{m}_3 \end{pmatrix} \quad (17)$$

Figure 28:
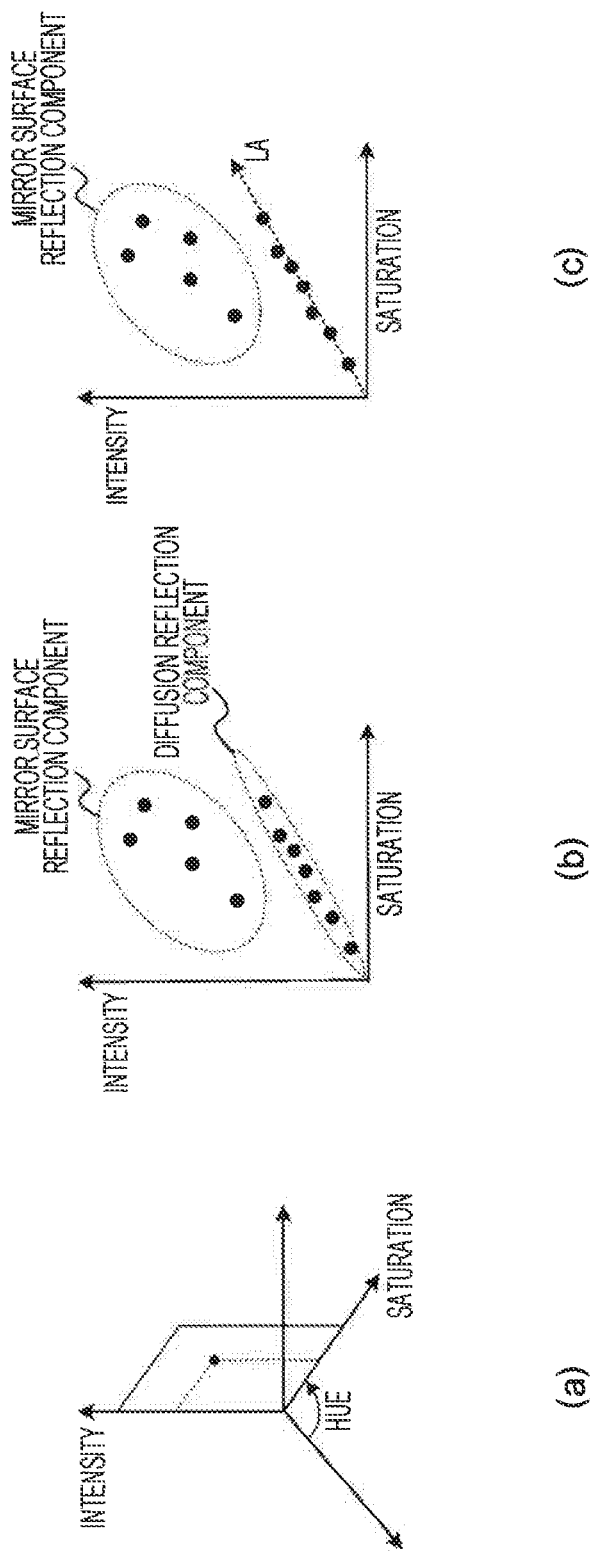
FIG. 28 is a diagram for explaining processing to remove a mirror surface reflection component using an HSV space.

Also, the normal map generating unit 52 may remove mirror surface reflection components using a method described in a literature "Tomoaki Higo, Daisuke Miyazaki, Katsushi Ikeuchi. Kenkyu-Hokoku 2006-CVIM-155.2006/9/9. Realtime Removal of Specular Reflection Component Based on Dichromatic Reflection Model, Information Processing Society of Japan". In this method, a fact that in a diffusion reflection component the saturation and the intensity are in a proportional relation is used in one hue space upon projection to the HSV space. FIG. 28 is a diagram for explaining processing to remove a mirror surface reflection component using an HSV space. The normal map generating unit 52 plots relation between the saturation and the intensity for every hue as illustrated in (b) of FIG. 28 using the HSV space illustrated in (a) of FIG. 28 converted from the RGB space. The normal map generating unit 52 further removes, as a mirror surface reflection component, a component an intensity of which is higher than a predetermined amount with respect to a linear line LA approximated as illustrated in (c) of FIG. 28.

The normal map generating unit 52 generates normal information from the polarized image removed of mirror surface reflection, that is, a polarized image representing only diffusion reflection components.

The normal map generating unit 52 may further generate a normal map including the mirror surface reflection component. FIG. 29 is a diagram illustrating relation between the intensity and the polarization angle (in the case of mirror surface reflection). Note that (a) of FIG. 29 is a diagram representing a relation between the intensity and the polarization angle in mirror surface reflection and a relation between the intensity and the polarization angle in diffusion reflection is illustrated in (b) of FIG. 29 for the purpose of comparison.

In the case of mirror surface reflection, a polarization angle vpol when the minimum intensity Ismin is observed is defined as an azimuth angle $\phi_s$. When such a definition is made, a polarization model formula representing intensity Ispol observed when the polarizing plate PL is rotated as illustrated in FIG. 14, that is, a predetermined intensity change occurring due to a difference in polarization angle can be expressed as mathematical formula (18).

[Mathematical Formula 9]

$$I_{spol} = \frac{I_{smax} + I_{smin}}{2} + \frac{I_{smax} - I_{smin}}{2} \cos 2(u_{pol} - \phi_s + 90) \quad (18)$$

In mathematical formula (18), a polarization angle vpol is clear upon generation of a polarized image. The maximum intensity Ismax, the minimum intensity Ismin, and the azimuth angle $\phi_s$ are variables. The normal map generating unit 52 thus performs fitting to the function expressed by mathematical formula (18) using the intensity of the polarized image having three or more polarization directions since there are three variables and thereby determines the azimuth angle $\phi_s$ with which the intensity becomes the smallest on the basis of the function representing relation between the intensity and the polarization angle.

Also, the object surface normal is expressed in a polar coordinate system. Normal information includes the azimuth angle $\phi_s$ and the zenith angle $\phi_s$. Note that the zenith angle $\phi_s$ is an angle formed from the z axis toward a normal and the azimuth angle $\phi_s$ is an angle formed from the x axis in the y axis direction. Here, the degree of polarization $\rho_s$ can be calculated by performing calculation of mathematical formula (19) also by using the minimum intensity Ismin and the maximum intensity Ismax obtained by rotating the polarizing plate PL.

[Mathematical Formula 10]

$$\rho_s = \frac{I_{smax} - I_{smin}}{I_{smax} + I_{smin}} \quad (19)$$

Figure 30:
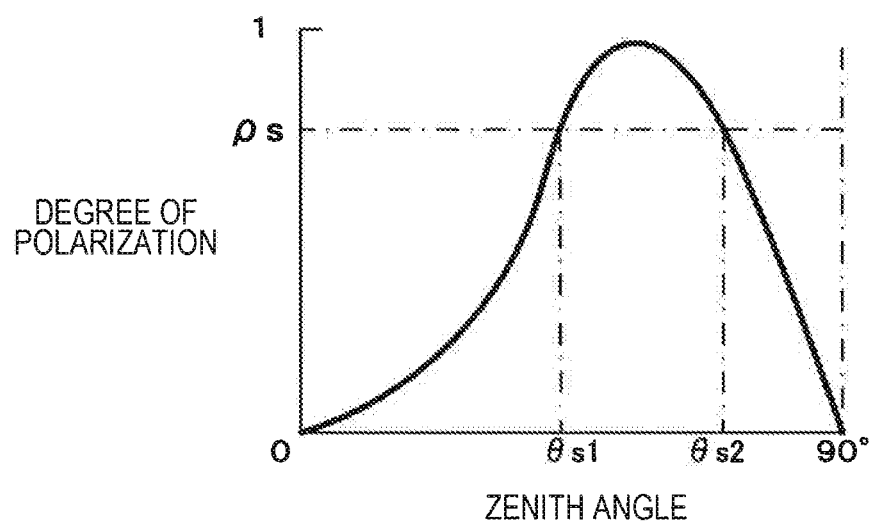
FIG. 30 is a diagram exemplifying relation between the degree of polarization and the zenith angle (in the case of diffusion reflection).

It is known that relation between the degree of polarization and the zenith angle (in the case of mirror surface reflection) has a characteristic illustrated in FIG. 30. One or two zenith angles can be determined on the basis of the degree of polarization $\rho_s$ from the characteristic illustrated in FIG. 30. Note that the characteristic illustrated in FIG. 30 is an example and the characteristic varies depending on a refractive index of an object. Also, a case where two zenith angles $\phi_{s1}$ and $\phi_{s2}$ are determined is exemplified in FIG. 30.

The normal map generating unit 52 further integrates an azimuth angle $\phi_d$ and a zenith angle $\phi_d$ calculated from a diffusion reflection component and an azimuth angle $\phi_s$ and a zenith angle $\phi s$ calculated from a mirror surface reflection component and generates a normal map representing an azimuth angle $\phi ds$ and a zenith angle $\phi ds$ after integration. The normal map generating unit 52 averages each of the acquired azimuth angles and the zenith angles for example as integration processing. Specifically, integration processing is performed on the basis of mathematical formula (20) and an azimuth angle $\phi ds$ is generated. Also, there is a case where two zenith angles $\phi s$ are determined in the normal map generating unit 52 and thus integration processing is performed on the basis of mathematical formulas (21) and (22) and a zenith angle $\phi ds$ is generated.

[Mathematical Formula 11]

$$\phi ds = \frac{(\phi d + \phi s)}{2} \quad (20)$$

$$\text{Where } |\theta d - \theta s1| \leq |\theta d - \theta s2|, \theta ds = \frac{(\theta d + \theta s1)}{2} \quad (21)$$

$$\text{Where } |\theta d - \theta s1| > |\theta d - \theta s2|, \theta ds = \frac{(\theta d + \theta s2)}{2} \quad (22)$$

The normal map generating unit 52 may further integrate an azimuth angle $\phi d$ and a zenith angle $\phi d$ calculated from a diffusion reflection component and an azimuth angle $\phi s$ and a zenith angle $\phi s$ calculated from a mirror surface reflection component with weighting in accordance with which one of diffusion reflection and mirror surface reflection is dominant. For weighting, for example, the amplitude of intensity is used and the one with a larger amplitude is selected. Also, a fitting error is used and the one with smaller error is selected to perform integration processing. A fitting error is a difference between a function value and an intensity of a polarized image in a case where fitting to a function expressed by mathematical formula (2) or (18) is performed. For example, an integrated value or an average value of errors between a function value and an intensity for every polarization direction is used.

In a case where integration processing is performed using an amplitude of an intensity, the normal map generating unit 52 integrates an azimuth angle and a zenith angle by calculating an amplitude of an intensity for every reflection component and selecting the one with a larger amplitude. Furthermore, as for a mirror surface reflection component, two zenith angles may be determined and thus the one closer to a zenith angle obtained for a diffusion reflection component is selected. Mathematical formula (23) is a calculation formula of an amplitude Ad in diffusion reflection. Mathematical formula (24) is a calculation formula of an amplitude As in mirror surface reflection.

$$Ad = Id\,\text{max} - Id\,\text{min} \quad (23)$$

$$As = Is\,\text{max} - Is\,\text{min} \quad (24)$$

The normal map generating unit 52 performs integration processing by weighting using an amplitude in a diffusion reflection component and an amplitude in a mirror surface reflection component and generates an azimuth angle $\phi ds$ as expressed by mathematical formula (25). The normal map generating unit 52 further performs integration by weighting using an amplitude in a diffusion reflection component and an amplitude in a mirror surface reflection component and generates a zenith angle $\phi ds$ as expressed by mathematical formulas (26) and (27).

[Mathematical Formula 12]

$$\phi ds = \frac{Ad}{Ad + As}\phi d + \frac{As}{Ad + As}\phi s \quad (25)$$

$$\text{Where } |\theta d - \theta s1| \leq |\theta d - \theta s2|, \theta ds = \frac{Ad}{As + Ad}\theta d + \frac{As}{As + Ad}\theta s1 \quad (26)$$

$$\text{Where } |\theta d - \theta s1| > |\theta d - \theta s2|, \theta ds = \frac{Ad}{As + Ad}\theta d + \frac{As}{As + Ad}\theta s2 \quad (27)$$

Also, the normal map generating unit 52 may select one of normal information generated from a polarized image of diffusion reflection components and normal information generated from a polarized image of mirror surface reflection components as integration of normal information. Here, a normal information integrating unit 38 selects normal information of reflection that is dominant out of diffusion reflection and mirror surface reflection. The normal information integrating unit 38 selects normal information of a component having a larger amplitude out of an amplitude Ad of a diffusion reflection component and an amplitude As of a mirror surface reflection component by regarding reflection having a larger intensity change caused by a difference in polarization angle as being dominant. Also, the normal information integrating unit 38 selects normal information of a component having a smaller error out of a fitting error of a diffusion reflection component and a fitting error of a mirror surface reflection component by regarding reflection having a smaller error with respect to predetermined intensity change caused by a difference in polarization angle as being dominant. Alternatively, the normal information integrating unit 38 may determine an error with surrounding normal information and select normal information with a smaller error. Further alternatively, the normal information integrating unit 38 may select normal information by combining these methods or select normal information by also combining another method. Moreover, in a case where normal information of a mirror surface reflection component is selected and two zenith angles $\phi s1$ and $\phi s2$ are determined as described above, the normal information integrating unit 38 selects a zenith angle having a smaller angular difference from a zenith angle $\phi d$ represented by normal information of a diffusion reflection component out of zenith angles $\phi s1$ and $\phi s2$. That is, by using a polarized image in colors, an accurate normal map can be generated considering reflection components.

The imaging device configured in this manner can generate an accurate normal map by using a polarized image in black and white for example in a case of imaging environment where no mirror surface reflection occurs or a case where a normal map having a high spatial resolution is generated. Also, for example in a case of imaging environment where mirror surface reflection tends to occur such as the outside under clear sky, an accurate normal map can be generated by performing processing considering a mirror surface reflection component using a polarized image in colors.

Note that the processing illustrated by the flowchart described above is not limited to sequential processing in which processing is performed in the order of the steps but may be performed by pipeline processing or parallel processing. Also, the color filter is not limited to that of primary colors but a color filter of complementary colors may be used.

5. Exemplary Application

Figure 31:
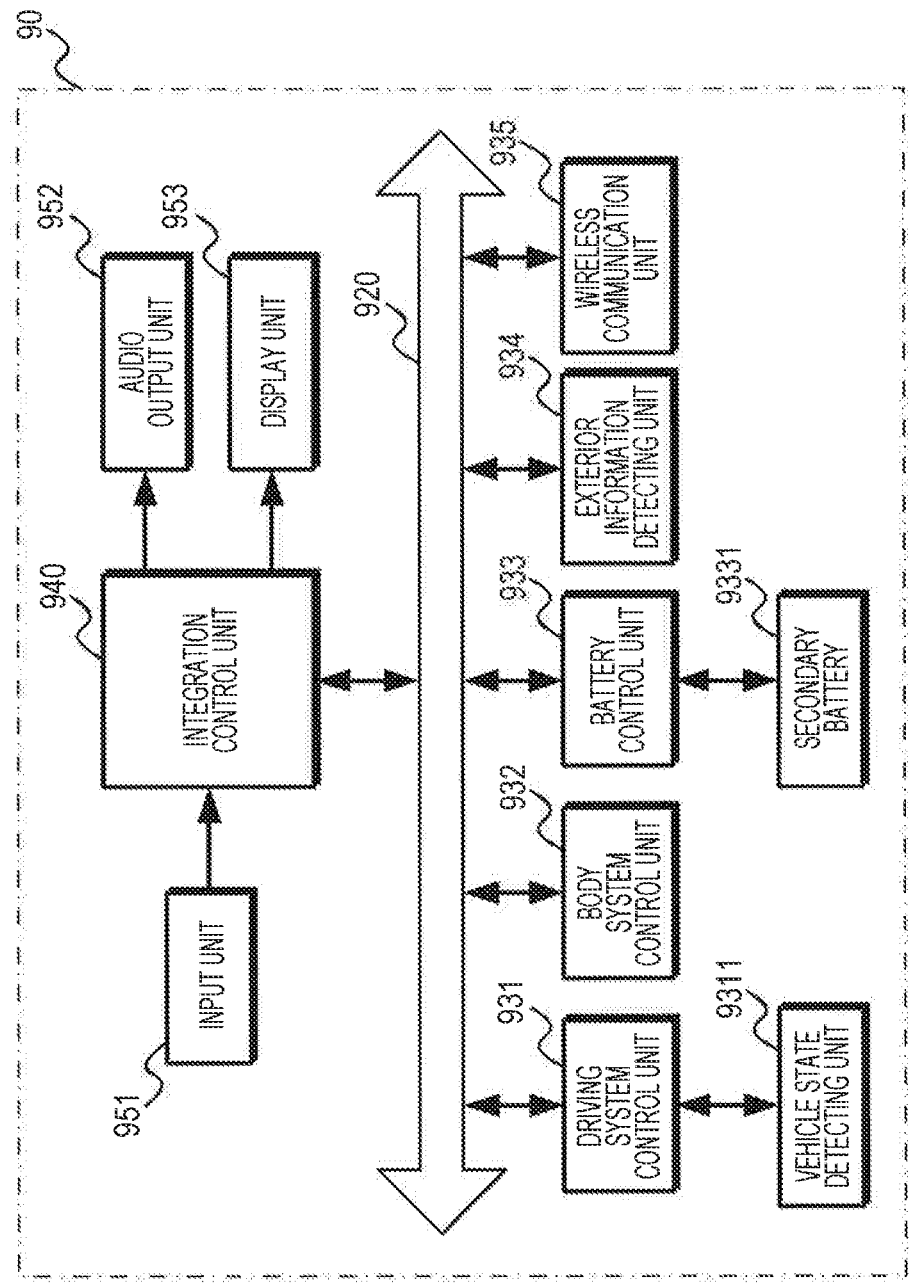
FIG. 31 is a block diagram exemplifying a schematic configuration of a vehicle control system.

Next, exemplary application of the imaging device and the image processing device (image processing method) will be described. FIG. 31 is a block diagram exemplifying a schematic configuration of a vehicle control system using the imaging device and the image processing device of the present technology. A vehicle control system 90 includes a plurality of control units or detecting units connected via a communication network 920. In the example illustrated in FIG. 31, the vehicle control system 90 includes a driving system control unit 931, a body system control unit 932, a battery control unit 933, an exterior information detecting unit 934, a wireless communication unit 935, and an integration control unit 940. The communication network 920 may be, for example, an on-board communication network compliant with a desired standard such as a controller area network (CAN), a local interconnect network (LIN), a local area network (LAN), or FlexRay (registered trademark). Moreover, the integration control unit 940 is connected with an input unit 951, an audio output unit 952, and a display unit 953.

Each of the control units includes a microcomputer which performs calculation processing in accordance with various programs, a storage unit which stores a program executed by the microcomputer or parameters used for various calculations, and a driving circuit which drives a device of various types to be controlled.

The driving system control unit 931 controls operation of a device related to a driving system of a vehicle in accordance with various programs. For example, the driving system control unit 931 functions as a driving force generating device for generating driving force of a vehicle such as an internal combustion engine or a driving motor, a driving force transmission mechanism for transmitting driving force to wheels, and a steering mechanism for adjusting a steering angle of the vehicle. The driving system control unit 931 may further have a function as a control device such as a braking device for generating braking force of the vehicle or a function as a control device such as an antilock brake system (ABS) or electronic stability control (ESC).

The driving system control unit 931 is connected with a vehicle state detecting unit 9311. The vehicle state detecting unit 9311 includes at least one of a gyrosensor for detecting an angular velocity of axial rotation motion of a vehicle body, an acceleration sensor for detecting acceleration of a vehicle, and a sensor for detecting an operation amount of an acceleration pedal, an operation amount of a brake pedal, a steering angle of a steering wheel, an engine speed, or a driving speed. The driving system control unit 931 performs calculation processing using a signal input from the vehicle state detecting unit 9311 and controls an internal combustion engine, driving motor, an electric power steering device, or a braking device.

The body system control unit 932 controls operation of various devices mounted to a vehicle body in accordance with various programs. For example, the body system control unit 932 functions as a keyless entry system, a smart key system, an automatic window device, or a control device of various types of lamps such as a head lamp, a back lamp, a brake lamp, an indicator lamp, or a fog lamp. In this case, the body system control unit 932 may be input with a signal of a radio wave transmitted from a portable device that substitute a key or of various switches. The body system control unit 932 receives input of such a radio wave or a signal and controls a door lock device, an automatic window device, a lamp device, or other devices of the vehicle.

The battery control unit 933 controls the secondary battery 9331 that is a power supply source of the driving motor in accordance with various programs. For example, the battery control unit 933 is input with information such as a battery temperature, a battery output voltage, or a remaining capacity of the battery from a battery device including the secondary battery 9331. The battery control unit 933 performs calculation processing using these signals and performs temperature adjusting control of the secondary battery 9331 or control of a cooling device or other devices included in the battery device.

The exterior information detecting unit 934 detects external information of the vehicle mounted with the vehicle control system 90. The exterior information detecting unit 934 uses an imaging device and an image processing device of the present technology.

Figure 32:
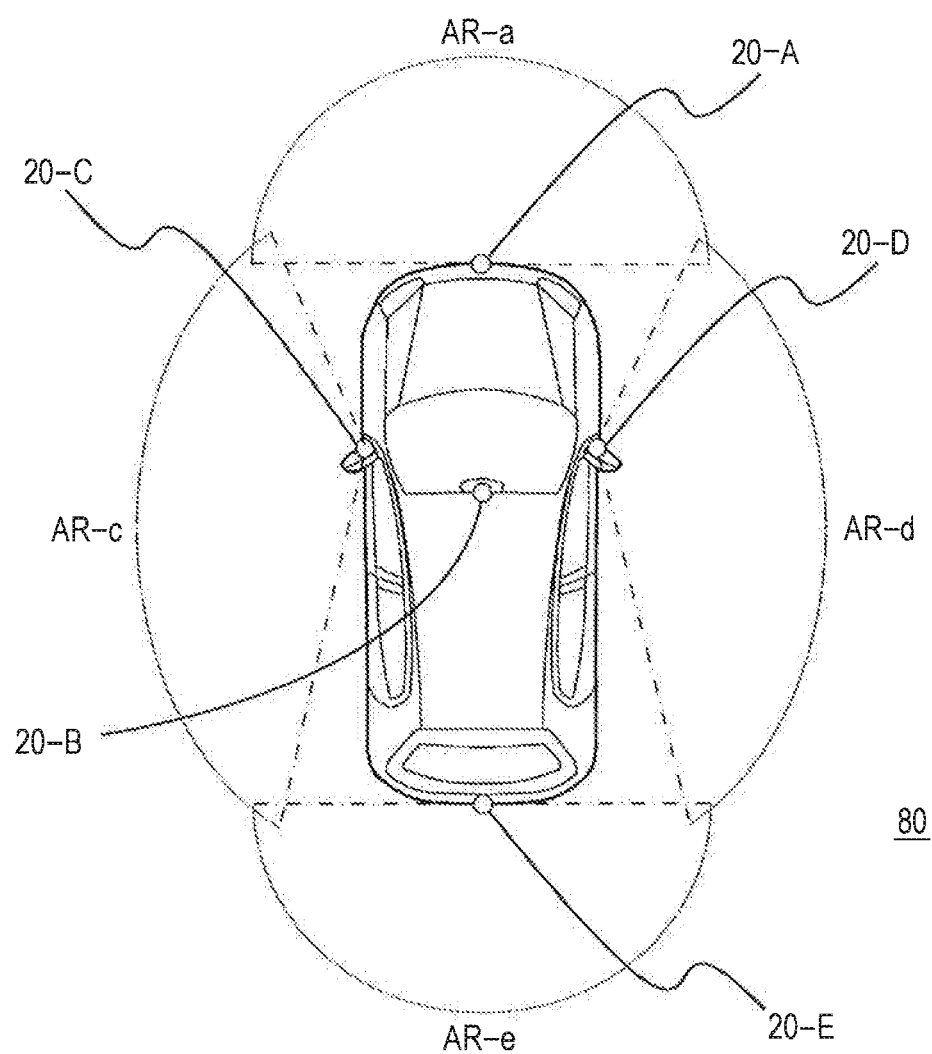
FIG. 32 is a diagram illustrating an example of installment of the imaging device.

FIG. 32 is a diagram illustrating an example of installment of the imaging device. An imaging device 20 including imaging units 21, 22, and 23 is installed at at least one position out of a front nose, side mirrors, a rear bumper, a back door, and an upper part of a front glass in a vehicle interior of a vehicle 80, for example. An imaging device 20-A provided at the front nose and an imaging device 20-B provided at the upper part of the front glass in the vehicle interior mainly acquires an image in front of the vehicle 80. Imaging devices 20-C and 20-D provided at the side mirrors mainly acquires an image on sides of the vehicle 80. An imaging device 20-E provided at the rear bumper or the back door mainly acquires an image in a rear side of the vehicle 80. Note that FIG. 32 is a diagram illustrating an exemplary imaging range of the respective imaging devices 20-A to 20-E. An imaging range AR-a represents an imaging range of the imaging device 20-A provided at the front nose. Imaging ranges AR-c and AR-d represent an imaging range of the imaging devices 20-C and 20-D, respectively, provided at the side mirrors. An imaging range AR-e represents an imaging range of the imaging device 20-E provided at the rear bumper or the back door.

Referring back to FIG. 31, the exterior information detecting unit 934 images a surrounding area of the vehicle and acquires a polarized image and a non-polarized image. The exterior information detecting unit 934 further generates information that can be used for vehicle control from the acquired polarized image, for example a depth map having a high accuracy corresponding to the non-polarized image.

The wireless communication unit 935 performs communication with a control center controlling the outside of the vehicle such as other vehicles or road environment via a wireless communication network such as dedicated short range communication (DSRC) (registered trademark) and outputs the received information to the integration control unit 940. Furthermore, the wireless communication unit 935 may transmit information acquired by the exterior information detecting unit 934 to another vehicle, a control center, or other entities. Note that the wireless communication unit 935 may perform communication with a control center via a wireless communication network such as a wireless communication network of a wireless LAN, or a wireless communication network for cellular phones such as 3G, LTE, and 4G. The wireless communication unit 935 may further perform ranging by receiving signals of the global navigation satellite system (GNSS) and output a ranging result to the integration control unit 940.

The integration control unit 940 is connected with the input unit 951, the audio output unit 952, and the display unit 953. The input unit 951 is implemented by a device that can be operated for input by a passenger such as a touch panel, a button, a microphone, a switch, or a lever. The input unit 951 generates an input signal on the basis of information input by a passenger or another person and outputs to the integration control unit 940.

The audio output unit 952 aurally notifies information to a passenger of the vehicle by outputting audio based on an audio signal from the integration control unit 940. The display unit 953 visually notifies information to a passenger of the vehicle by displaying an image on the basis of an image signal from the integration control unit 940.

The integration control unit 940 includes a central processing unit (CPU), a read only memory (ROM), a random access memory (RAM), or other components. The read only memory (ROM) stores various programs executed by the central processing unit (CPU). The random access memory (RAM) stores information such as various parameters, calculation results, or sensor values. The CPU executes various programs stored in the ROM and controls operation in general in the vehicle control system 90 in accordance with an input signal from the input unit 951, information acquired by communication with each of the control units, the exterior information detecting unit, and the wireless communication unit via the communication network 920 and information stored in the RAM. The integration control unit 940 further generates an audio signal representing information to be aurally notified to a passenger of the vehicle and outputs to the audio output unit 952. The integration control unit 940 also generates an image signal that visually notifies information and outputs to the display unit 953. The integration control unit 940 further communicates with various devices existing outside the vehicle such as other vehicles or a control center using the wireless communication unit 935. The integration control unit 940 further performs driving assist of the vehicle on the basis of map information stored in the ROM or the RAM and a ranging result acquired from the wireless communication unit 935.

Note that, in the example illustrated in FIG. 31, at least two control units connected via the communication network 920 may be integrated as one control unit. Alternatively, each of the control units may include a plurality of control units. Further alternatively, the vehicle control system 90 may include another control unit not illustrated. Also, in the descriptions above, a part or all of functions performed by any one of the control units may be performed by another control unit. That is, as long as transmission and reception of information is performed via the communication network 920, predetermined calculation processing may be performed by any of the control units.

In such a vehicle control system, a peripheral image in which deterioration of an image quality or intensity is suppressed and a depth map with a high accuracy corresponding to the peripheral image can be obtained by using an imaging device and an image processing device of the present technology. Therefore, using a peripheral image in which deterioration of an image quality or intensity is suppressed and a depth map corresponding to the peripheral image allows, for example, an object to be accurately recognized and a vehicle control system capable of safely driving on the basis of a result of object recognition to be established.

Meanwhile, a series of processing described herein can be executed by hardware, software, or a composite configuration thereof. In a case where processing by software is executed, a program storing a processing sequence is installed in a memory in a computer incorporated in dedicated hardware and thereby executed. Alternatively, the program may be installed in a general purpose computer capable of executing various processing and thereby executed.

For example, the program may be prestored in a hard disc, a solid state drive (SSD), or a read only memory (ROM) being as a recording medium. Alternatively, the program may be temporarily or permanently stored in a removable storage medium such as a flexible disc, a compact disc read only memory (CD-ROM), a magneto optical (MO) disc, a digital versatile disc (DVD), a Blu-Ray Disc (BD) (registered trademark), a magnetic disc, or a semiconductor memory card. Such a removable storage medium can be provided as a so-called package software.

Alternatively, the program may be installed in a computer from a removable storage medium or may be forwarded from a download site to a computer via a network such as a local area network (LAN) or the Internet in a wireless or wired manner. The computer can receive the program forwarded in such a manner and install the program in a storage medium such as an incorporated hard disc.

Moreover, the present technology shall not be interpreted limited to the embodiments of the technology described above. The embodiments of the technology disclose the present technology in the form of examples and thus it is clear that a person skilled in the art can modify or substitute the embodiment within a range not departing from the principals of the present technology. That is, in order to determine the principals of the present technology, claims are to be considered.

Note that the Imaging device of the present technology may also be configured as follows.

(1) An imaging device, including:

a first imaging unit and a second imaging unit including a pixel having a polarization characteristic for each of a plurality of polarization directions; and a third imaging unit including a pixel not having a polarization characteristic and interposed between the first imaging unit and the second imaging unit.

(2) The imaging device according to (1), in which the first imaging unit, the second imaging unit, and the third imaging unit are matched in terms of vertical and horizontal directions, and an optical axis position of the third imaging unit is positioned on a line connecting optical axis positions of the first imaging unit and the second imaging unit.

(3) The imaging device according to (1) or (2), in which the first imaging unit, the second imaging unit, and the third imaging unit are included such that optical axis directions thereof are parallel each other.

(4) The imaging device according to any one of (1) to (3), in which the first imaging unit, the second imaging unit, and the third imaging unit are included such that entrance pupils thereof are positioned on the same line perpendicular to optical axis directions thereof.

(5) The imaging device according to any one of (1) to (4), in which the third imaging unit has a larger number of pixels than that of the first imaging unit and the second imaging unit.

(6) The imaging device according to any one of (1) to (5), in which the first imaging unit and the second imaging unit are included by being fixed on both sides of the third imaging unit.

(7) The imaging device according to any one of (1) to (5), further including:

an adaptor attached to the third imaging unit in an attachable and detachable manner; and a position adjusting mechanism for matching vertical and horizontal directions of the first imaging unit and the second imaging unit to vertical and horizontal directions of the third imaging unit, in which the first imaging unit and the second imaging unit are provided to the adaptor, and the position adjusting mechanism is provided to one of the adaptor and the third imaging unit.

(8) The imaging device according to (7), further including:

a communication unit for performing communication between the first imaging unit and the second imaging unit and a main body unit which uses an image generated by the first imaging unit and an image generated by the second imaging unit.

Alternatively, the image processing device of the present technology may also be configured as follows.

(1) An image processing device, including:

a depth map generating unit for generating a depth map from a viewpoint of a first imaging unit by performing matching processing using a first image generated by the first imaging unit including a pixel having a polarization characteristic for each of a plurality of polarization directions and a second image generated by a second imaging unit having a configuration equivalent to that of the first imaging unit;

a normal map generating unit for generating a normal map on the basis of a polarization state of the first image generated by the first imaging unit;

a map integrating unit for generating an integrated map by performing integration processing of the depth map generated by the depth map generating unit and the normal map generated by the normal map generating unit; and a viewpoint converting unit for converting the integrated map generated by the map integrating unit or the depth map generated by the depth map generating unit and the normal map generated by the normal map generating unit into a map from a viewpoint of a third imaging unit interposed between the first imaging unit and the second imaging unit, the third imaging unit including a pixel having no polarization characteristic.

(2) The image processing device according to (1), in which the viewpoint converting unit converts the depth map generated by the depth map generating unit and the normal map generated by the normal map generating unit into a map from a viewpoint of the third imaging unit.

(3) The image processing device according to (1) or (2), in which the normal map generating unit generates the normal map on the basis of intensity of the first image having three or more polarization directions.

(4) The image processing device according to any one of (1) to (3), in which the map integrating unit calculates a depth value not represented in the depth map from a surface shape determined on the basis of a depth value represented in the depth map and the normal map.

(5) The image processing device according to any one of (1) to (4), further including:

a map converting unit for converting the depth map into a map of a large number of pixels, in which the third imaging unit has a larger number of pixels than those of the first imaging unit and the second imaging unit, and the map converting unit converts the depth map from a viewpoint of the third imaging unit after the integration processing into a depth map corresponding to an image generated by the third imaging unit.

(6) The image processing device according to any one of (1) to (5), in which the first image and the second image are in colors, and the normal map generating unit performs separation or extraction of a reflection component from the first image and generates the normal map on the basis of a polarization state of an image after the separation or the extraction.

(7) The image processing device according to any one of (1) to (5), in which the first image and the second image are in black and white.

INDUSTRIAL APPLICABILITY

In an imaging device, an image processing device, and an image processing method of the present technology, a first imaging unit and a second imaging unit including a pixel having a polarization characteristic for each of a plurality of polarization directions; and a third imaging unit including a pixel not having a polarization characteristic and interposed between the first imaging unit and the second imaging unit are included. Also, by matching processing using a first image generated by the first imaging unit and a second image generated by the second imaging unit having a configuration equivalent to that of the first imaging unit, a depth map from a viewpoint of the first imaging unit is generated. Furthermore, a normal map is generated on the basis of a polarization state of the first image generated by the first imaging unit. A depth map of a higher accuracy is then generated by integration processing of the generated depth map and the normal map. Thereafter, the depth map after integration processing or the depth map before integration processing and the normal map are converted into a map from a viewpoint of the third imaging unit interposed between the first imaging unit and the second imaging unit. As a result of this, an image free from deterioration of an image quality and intensity and a depth map with a high accuracy corresponding to the image can be generated. Therefore, the present technology is suitable for devices which acquire a three-dimensional shape of an object.

REFERENCE SIGNS LIST

10 Imaging device
21, 22, 23 Imaging unit
25 Depth map generating unit
31 Adaptor
33 Position adjusting mechanism
35, 45 Communication unit
40 Main body unit
50 Image processing unit
51 Depth map generating unit
52 Normal map generating unit
53 Depth map viewpoint converting unit
54 Normal map viewpoint converting unit
55 Map integrating unit
56 Integrated map viewpoint converting unit
57 Up-sampling unit
201, 231 Lens unit
202 Diaphragm
211 Polarizer
235 Color filter

The invention claimed is:

1. An imaging processing device, comprising: circuitry configured to generate a first polarized image from a first plurality of pixels having a polarization characteristic for one of a plurality of polarization directions, generate a second polarized image from a second plurality of pixels having a polarization characteristic for one of the plurality of polarization directions, generate a non-polarized image from a third plurality of pixels having no polarization characteristic, generate an integrated depth map using the first polarized image and the second polarized image, and convert the integrated depth map to generate a depth value for each pixel of the third plurality of pixels, wherein the circuitry is further configured to generate a depth map based on the first polarized image and the second polarized image and a normal map based on the first polarized image, generate the integrated depth map based on the depth map and the normal map, convert the integrated depth map to generate the depth value for each pixel of the third plurality of pixels, perform filter processing the first polarized image and the second polarized image to generate a matching image, perform matching processing the matching image, and generate the depth map by the performing matching processing.

2. The imaging processing device according to claim wherein the circuitry is further configured to perform edge extracting processing the matching image, perform matching processing the matching image performed edge extracting processing, and generate the depth map by the performing matching processing.

3. The imaging processing device according to claim 1, wherein the circuitry is further configured to perform up-sampling processing of the converted integrated depth map to generate the depth value for each pixel of the third plurality of pixels.

4. An image processing method comprising:

generating a first polarized image from a first plurality of pixels having a polarization characteristic for one of a plurality of polarization directions;

generating a second polarized image from a second plurality of pixels having a polarization characteristic for one of the plurality of polarization directions;

generating a non-polarized image from a third plurality of pixels having no polarization characteristic;

generating an integrated depth map using the first polarized image and the second polarized image;

converting the integrated depth map to generate a depth value for each pixel of the third plurality of pixels;

generating a depth map based on the first polarized image and the second polarized image and a normal map based on the first polarized image;

generating the integrated depth map based on the depth map and the normal map; and converting the integrated depth map to generate the depth value for each pixel of the third plurality of pixels.

5. The imaging processing method according to claim 4, further comprising:

performing filter processing the first polarized image and the second polarized image to generate a matching image;

performing matching processing the matching image; and generating the depth map by the performing matching processing.

6. The imaging processing method according to claim 5, further comprising:

performing edge extracting processing the matching image;

performing matching processing the matching image performed edge extracting processing; and generating the depth map by the performing matching processing.

7. The imaging processing method according to claim 4, further comprising:

performing up-sampling processing of the converted integrated depth map to generate the depth value for each pixel of the third plurality of pixels.

8. A non-transitory computer-readable medium having embodied thereon a program, which when executed by a computer, causes the computer to execute a method, the method comprising:

generating a first polarized image from a first plurality of pixels having a polarization characteristic for one of a plurality of polarization directions;

generating a second polarized image from a second plurality of pixels having a polarization characteristic for one of the plurality of polarization directions;

generating a non-polarized image from a third plurality of pixels having no polarization characteristic;

generating an integrated depth map using the first polarized image and the second polarized image;

converting the integrated depth map to generate a depth value for each pixel of the third plurality of pixels;

generating a depth map based on the first polarized image and the second polarized image and a normal map based on the first polarized image;

generating the integrated depth map based on the depth map and the normal map; and converting the integrated depth map to generate the depth value for each pixel of the third plurality of pixels.

9. The non-transitory computer-readable medium according to claim 8, wherein the method further comprises:

performing filter processing the first polarized image and the second polarized image to generate a matching image;

performing matching processing the matching image; and generating the depth map by the performing matching processing.

10. The non-transitory computer-readable medium according to claim 9, wherein the method further comprises:

performing edge extracting processing the matching image;

performing matching processing the matching image performed edge extracting processing; and generating the depth map by the performing matching processing.

11. The non-transitory computer-readable medium according to claim 8, wherein the method further comprises:

performing up-sampling processing of the converted integrated depth map to generate the depth value for each pixel of the third plurality of pixels.

12. An image processing method comprising:

generating a first polarized image from a first plurality of pixels having a polarization characteristic for one of a plurality of polarization directions;

generating a second polarized image from a second plurality of pixels having a polarization characteristic for one of the plurality of polarization directions;

generating a non-polarized image from a third plurality of pixels having no polarization characteristic;

generating an integrated depth map using the first polarized image and the second polarized image;

converting the integrated depth map to generate a depth value for each pixel of the third plurality of pixels; and performing up-sampling processing of the converted integrated depth map to generate the depth value for each pixel of the third plurality of pixels.

13. A non-transitory computer-readable medium having embodied thereon a program, which when executed by a computer, causes the computer to execute a method, the method comprising:
- generating a first polarized image from a first plurality of pixels having a polarization characteristic for one of a plurality of polarization directions;
- generating a second polarized image from a second plurality of pixels having a polarization characteristic for one of the plurality of polarization directions;
- generating a non-polarized image from a third plurality of pixels having no polarization characteristic;
- generating an integrated depth map using the first polarized image and the second polarized image;
- converting the integrated depth map to generate a depth value for each pixel of the third plurality of pixels; and
- performing up-sampling processing of the converted integrated depth map to generate the depth value for each pixel of the third plurality of pixels.

* * * * *